US007271556B2

(12) United States Patent
Kishibe et al.

(10) Patent No.: US 7,271,556 B2
(45) Date of Patent: Sep. 18, 2007

(54) METHOD AND APPARATUS FOR ESTIMATING ROTOR POSITION OF SWITCHED RELUCTANCE MOTOR, AND METHOD AND APPARATUS FOR SENSORLESS CONTROL OF SWITCHED RELUCTANCE MOTOR

(75) Inventors: Taro Kishibe, Nishinomiya (JP); Subrata Saha, Anjo (JP); Hiroshi Murakami, Suita (JP); Kazushige Narazaki, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 78 days.

(21) Appl. No.: 10/536,571

(22) PCT Filed: Nov. 28, 2002

(86) PCT No.: PCT/JP02/12412

§ 371 (c)(1),
(2), (4) Date: Nov. 2, 2005

(87) PCT Pub. No.: WO2004/049552

PCT Pub. Date: Jun. 10, 2004

(65) Prior Publication Data

US 2006/0125427 A1 Jun. 15, 2006

(51) Int. Cl.
*H02P 1/18* (2006.01)

(52) U.S. Cl. .................... 318/254; 318/138; 318/700; 318/701

(58) Field of Classification Search ................ 318/254, 318/138, 439, 700, 701, 715, 721
See application file for complete search history.

(56) References Cited

U.S. PATENT DOCUMENTS 5,097,190 A 3/1992 Lyons et al.
5,140,243 A 8/1992 Lyons et al.

(Continued)

FOREIGN PATENT DOCUMENTS

EP 1 225 686 7/2002

(Continued)

OTHER PUBLICATIONS

B. Fahimi et al., "Review of Sensorless Control Methods in Switched Reluctance Motor", Industry Applications Conference, 2000, Conference Record of the 2000 IEEE, vol. 3 of 5, pp. 1850-1857.

(Continued)

*Primary Examiner*—Rina Duda
(74) *Attorney, Agent, or Firm*—RatnerPrestia

(57) ABSTRACT

A discrete rotor position estimation method for a synchronized reluctance motor is provided. A d.c.-link voltage $V_{dc}$ and a phase current $I_{ph}$ are sensed. A flux-linkage $\lambda_{ph}$ of an active phase is calculated from the sensed d.c.-link voltage $V_{dc}$ and the sensed phase current $I_{ph}$. The calculated flux-linkage $\lambda_{ph}$ is compared with a reference flux-linkage $\lambda_r$. The reference flux-linkage $\lambda_r$ corresponds to a reference angle $\theta_r$ which lies between angles corresponding to aligned rotor position and non-aligned rotor position in the synchronized reluctance motor. An estimated rotor position $\theta_{cal}$ is obtained only once when the calculated flux-linkage $\lambda_{ph}$ is greater than the reference flux-linkage $\lambda_r$.

11 Claims, 21 Drawing Sheets

U.S. PATENT DOCUMENTS

| | | | |
|---|---|---|---|
| 5,982,117 A * | 11/1999 | Taylor et al. | 318/254 |
| 6,211,633 B1 * | 4/2001 | Jones et al. | 318/254 |
| 6,456,031 B1 * | 9/2002 | Gallegos-Lopez et al. | 318/701 |

FOREIGN PATENT DOCUMENTS

| | | |
|---|---|---|
| JP | 2001-57791 | 2/2001 |

OTHER PUBLICATIONS

G. Suresh et al., "Inductance Based Position Encoding for Sensorless SRM Drives", Power Electronics Specialists Conference; 1999, PESC 99, 30th Annual IEEE Charlestown, SC, IEEE, pp. 832-837.

S. Saha et al., "Developing a Sensorless Approach for Switched Reluctance Motors from a New Analytical Model", Industry Applications Conference, 1999, 34th IAS Annual Meeting, Conference Record of the 1999 IEEE Phoenix, AZ, Oct. 3-7, 1999, pp. 525-532.

* cited by examiner

METHOD AND APPARATUS FOR ESTIMATING ROTOR POSITION OF SWITCHED RELUCTANCE MOTOR, AND METHOD AND APPARATUS FOR SENSORLESS CONTROL OF SWITCHED RELUCTANCE MOTOR

This application is a U.S. National Phase application of PCT International Application No. PCT/JP2002/012412.

TECHNICAL FIELD

The present invention relates to the development of closed loop control techniques for switched reluctance motors (SRMs) without a shaft position sensor.

BACKGROUND ART

A switched reluctance motor (SRM) is energized phase by phase in sequence to generate reluctance torque and enable smooth motor rotation. A schematic diagram of a three phase switched reluctance motor is shown in FIG. 1. The number of strokes (N) in SRM per one mechanical revolution is dependent on the number of phases (M) and the number of rotor poles (P) and is given by, $$N = M*P \qquad (1).$$

Therefore, the stroke angle(S) in mechanical degrees is defined as, $$S = 360°/N \qquad (2).$$

When the number of poles is very large and the stroke angle is very small, the SRM is typically operated in open loop as a variable reluctance stepper motor and needs no knowledge of rotor position information during running condition. On the other hand, when the number of poles is small and the stroke angle is very large, the SRM is generally operated in closed loop during running condition and hence, the knowledge of accurate rotor position information is very important to rotate the motor.

Accurate rotor position information is typically obtained from a shaft position sensor. Shaft position sensors are expensive and have reliability problems and hence, the sensorless operation of SRM is desired.

In a typical position sensorless operation of SRM, rotor position estimation is carried out either discretely i.e. once per stroke angle or continuously. Discrete rotor position estimation is ideal for applications where slow speed response is required where as, continuous rotor position estimation is carried out in applications where fast speed response is desired. Rotor position estimation of the SRM can be carried out from the pre-determined knowledge of its non-linear per phase flux-linkage/current characteristics or the inductance/current characteristics as shown in FIG. 2 and FIG. 3 respectively. Several non-linear analytical models based on the flux-linkage and the inductance characteristics of the motor with respect to the rotor position have been proposed [S. Saha, K. Ochiai, T. Kosaka, N. Matsui and Y. Takeda "Developing a sensorless approach for switched reluctance motors from a new analytical model", 1999 IEEE-IAS Annual meeting, Vol. 1, pp 525-532., and G. Suresh, B. Fahimi, K. M. Rahaman and M. Eshani "Inductance based position encoding for sensorless SRM drives", 1999 IEEE-PESC Annual Meeting, pp 832-837.] to calculate the exact rotor position after sensing the d.c. link voltage $V_{dc}$ and the phase current $I_{ph}$ of the inverter drive circuit as shown in FIG. 4. A voltage sensor VS is used to sense the d.c. link voltage and three current sensors CS are used to sense the current flowing in each phase winding $1u$, $1v$ or $1w$ of the SRM 1. The traditional lock and forced drive method with open loop operation can be applied for the starting of these motors at no load. Rotor position estimation scheme is enabled at a minimum speed ($\omega_{min}$) which is normally 10% of the rated speed or higher. The motor moves from open loop to closed loop operation after the rotor position estimation scheme is enabled and then subsequently load is applied to the motor. The entire closed loop control scheme with the rotor position estimation is implemented with the help of a micro-controller or a digital-signal processor.

DISCLOSURE OF INVENTION

In a first aspect of the invention, provided is a discrete rotor position estimation method for a synchronized reluctance motor. According to this estimation method, d.c.-link voltage $V_{dc}$ and a phase current $I_{ph}$ are sensed. A flux-linkage $\lambda_{ph}$ of an active phase is calculated from the sensed d.c.-link voltage $V_{dc}$ and the sensed phase current $I_{ph}$. The calculated flux-linkage $\lambda_{ph}$ is compared with a reference flux-linkage $\lambda_r$. The reference flux-linkage $\lambda_r$ corresponds to a reference angle $\theta_r$ which lies between angles corresponding to aligned rotor position and non-aligned rotor position in the synchronized reluctance motor. An estimated rotor position $\theta_{cal}$ is obtained only once based on the comparison result when the calculated flux-linkage $\lambda_{ph}$ is greater than the reference flux-linkage $\lambda_r$. From the estimated rotor position $\theta_{cal}$, incremental rotor angle $\Delta\theta$ for every PWM interrupt is calculated. The knowledge of $\Delta\theta$ is finally used to control the motor.

In a second aspect of the invention, provided is a discrete rotor position estimation method for a synchronized reluctance motor. According to the method in the second aspect, a d.c.-link voltage $V_{dc}$ and a phase current $I_{ph}$ are sensed. A flux-linkage $\lambda_{ph}$ of an active phase is calculated from the sensed d.c.-link voltage $V_{dc}$ and the sensed phase current $I_{ph}$. The calculated flux-linkage $\lambda_{ph}$ is compared with either two or three reference flux-linkages such as $\lambda_{r1}, \ldots$. The reference flux-linkages $\lambda_{r1}, \ldots$ correspond to a reference rotor angles $\theta_{r1}, \ldots$ all of them lying between angles corresponding to aligned rotor position and non-aligned rotor position in the synchronized reluctance motor. Rotor positions $\theta_{cal1}, \ldots$ are obtained based on the comparison results, twice or thrice when the calculated flux-linkage $\lambda_{ph}$ is greater than the reference flux-linkage $\lambda_{r1}, \ldots$. From the estimated rotor positions $\theta_{cal1}, \ldots$ incremental rotor angles for every PWM interrupt are also calculated twice or thrice such as $\Delta\theta_1, \ldots$. The values of the incremental rotor angles are averaged to obtain the final incremental rotor angle $\Delta\theta$. The knowledge of the final incremental rotor angle $\Delta\theta$ is used to control the motor.

In the first aspect, the value of the estimated rotor position $\theta_{cal}$ obtained from comparison result typically equals the reference rotor angle $\theta_r$. However, the estimated rotor position $\theta_{cal}$ may be further modified with an incremental angle $\phi$ corresponding to the reference rotor angle $\theta_r$ to obtain a more accurate estimated rotor position. This idea can also be extended to the second aspect.

In a third aspect of the invention, provided is a discrete rotor position estimation method for a synchronized reluctance motor. According to the method, a d.c.-link voltage $V_{dc}$ and a phase current $I_{ph}$ are sensed. A flux-linkage $\lambda_{ph}$ of an active phase is calculated from the sensed d.c.-link voltage $V_{dc}$ and the sensed phase current $I_{ph}$. The calculated flux-linkage $\lambda_{ph}$ is compared with a reference flux-linkage $\lambda_r$. The reference flux-linkage $\lambda_r$ corresponds to a reference angle $\theta_r$, which lies between angles corresponding to aligned rotor position and non-aligned rotor position of the synchronized reluctance motor. An estimated rotor position $\theta_{cal}$ is calculated from the calculated flux-linkage $\lambda_{ph}$ using either one of the inductance model or the flux linkage model of the active phase, only once when the calculated flux-linkage $\lambda_{ph}$ is greater than the reference flux-linkage $\lambda_r$. In this case, the ideal instant to estimate the rotor position may be at one PWM interrupt before the next phase is turned ON. From the estimated rotor position $\theta_{cal}$, incremental rotor angle $\Delta\theta$ for every PWM interrupt is calculated. The knowledge of $\Delta\theta$ is finally used to control the motor.

The above idea can be also extended to estimate the rotor position either twice or thrice such as $\theta_{cal1}$, ... from the calculated flux-linkage $\lambda_{ph}$ using either one of the inductance model or the flux linkage model of the active phase, at every consecutive PWM interrupt when the calculated flux-linkage $\lambda_{ph}$ is greater than the reference flux-linkage $\lambda_r$. From the estimated rotor positions $\theta_{cal1}$, ... incremental rotor angles for every PWM interrupt are also calculated twice or thrice such as $\Delta\theta_1$, .... The values of the incremental rotor angles are averaged to obtain the final incremental rotor angle $\Delta\theta$. The knowledge of the final incremental rotor angle $\Delta\theta$ is used to control the motor.

In a fourth aspect of the invention, provided is a discrete rotor position estimation method for a synchronized reluctance motor. According to the method, a phase inductance of the synchronized reluctance motor is detected. A minimum region of the phase inductance during turn-on of an active phase is identified. An approximate rotor position $\theta_{app}$ is determined from the identified minimum inductance region. From the approximate rotor position $\theta_{app}$, incremental rotor angle $\Delta\theta$ for every PWM interrupt is calculated. The knowledge of $\Delta\theta$ is finally used to control the motor.

In a fifth aspect of the invention, provided is a control method of a synchronized reluctance motor and a technique to obtain the incremental rotor angle $\Delta\theta$ for every PWM interrupt. According to the control method, the estimated rotor position $\theta_{cal}$ is obtained by the previously described estimation methods. An absolute rotor position $\theta_{abs}$ is calculated from the estimated rotor position $\theta_{cal}$ by adding a stroke angle of the motor. The incremental rotor angle $\Delta\theta$ is determined by processing an error between the absolute rotor position $\theta_{abs}$ and a finally estimated rotor position $\theta_{est}$ through either one of a proportional-integral (PI) control and a proportional control. The finally estimated rotor position $\theta_{est}$ in every predetermined period is generated by adding the incremental rotor angle $\Delta\theta$ to the finally estimated rotor position $\theta_{est}$ in the previous cycle. Turn-on and turn-off angles of each phase is controlled based on the finally estimated rotor position $\theta_{est}$.

In a sixth aspect of the invention, provided is a control method of a synchronized reluctance motor and a technique to obtain the incremental rotor angle $\Delta\theta$ for every PWM interrupt. According to the control method, an incremental rotor angle $\Delta\theta$ is calculated by counting the number of PWM interrupts between two consecutive instants when the estimated rotor position $\theta_{cal}$ is obtained by the estimation method according to the invention. Delays to turn-off an active phase and turn-on the next phase is generated, in which the delays are normally defined with respect to the reference rotor position $\theta_r$. The delays are adjusted with the estimated rotor position $\theta_{cal}$ to turn-off the active phase and turn-on the next phase. A turn-on angle $\theta_{on}$ and a turn-off angle $\theta_{off}$ of each phase of the motor are controlled based on the adjusted delays decided by the incremental rotor angle $\Delta\theta$.

In the above control methods, a speed $\omega$ of the motor may be calculated from the incremental rotor angle $\Delta\theta$ in a relatively slower timer interrupt compared to a PWM interrupt, and a turn-on angle $\theta_{on}$ and a turn-off angle $\theta_{off}$ of each phase of the motor may be varied continuously based on the speed $\omega$ and the torque demand of the motor.

In a seventh aspect of the invention, provided is a control method of a synchronized reluctance motor. According to the control method, a peak of a phase current and a negative change rate of phase current in each phase are continuously monitored. Turn-off angle is kept fixed and turn-on angle is advanced so that a pre-determined peak phase current and a negative rate of change of phase current corresponding to the maximum torque are achieved.

In the control method, instead of monitoring the negative rate of change of phase current, a lead angle $\phi$ between the peak current and the peak flux in each phase may be detected to judge the maximum torque at the rated speed condition.

BEST MODE FOR CARRYING OUT THE INVENTION

The present invention relates to the closed loop control techniques of switched reluctance motors (SRM) without a shaft position sensor where the discrete rotor position estimation techniques are followed. Three typical discrete rotor estimation techniques I, II and III are described briefly below.

(Discrete Rotor Position Estimation Technique I)

Figure 5:
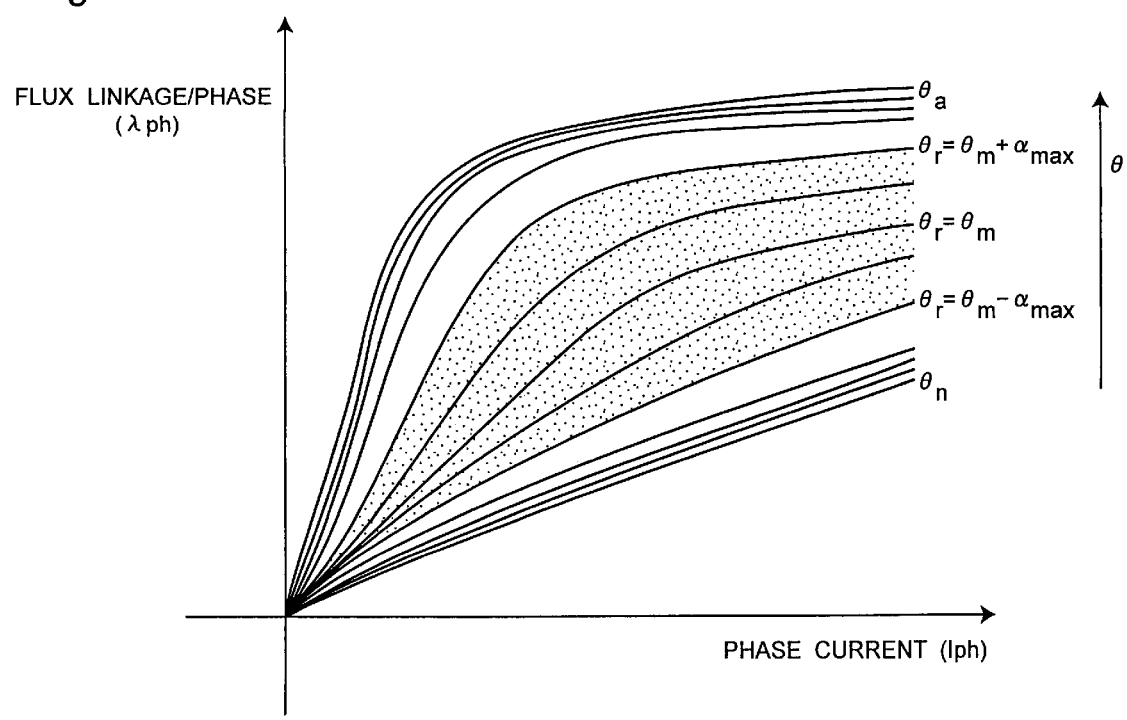
FIG. 5 shows the region where the reference rotor position $\theta_r$ corresponding to the reference flux-linkage $\lambda_r$ in rotor position estimation technique I can be defined

In the discrete rotor position estimation technique I, the per phase flux-linkage at rotor position $\theta_r$ as shown in FIG. 5 is chosen as a reference flux-linkage $\lambda_r$ and is expressed as a function of phase current $I_{ph}$ by a simple polynomial expression such as, $$\lambda_r = \Sigma A_n I_{ph}^n \quad (3).$$

$\theta_r$ is defined as any rotor position near the mid-position between the aligned and the non-aligned rotor position which is shown by the shaded area in FIG. 5. Mathematically $\theta_r$ can be expressed as, $$\theta_r = \theta_m \pm \alpha \quad (4)$$

where, $\theta_m$ is the exact middle position between the aligned and the non-aligned rotor position and $\alpha$ is the deviation angle whose maximum value $\alpha_{max}$ is equal to 300 electrical from the middle position. $\theta_m$ and $\alpha$ max are expressed in mechanical degrees as follows, $$\theta_m = (\theta_a + \theta_n)/2 \quad (5)$$

and $$\alpha_{max} = 30°/P \quad (6).$$

Figure 1:
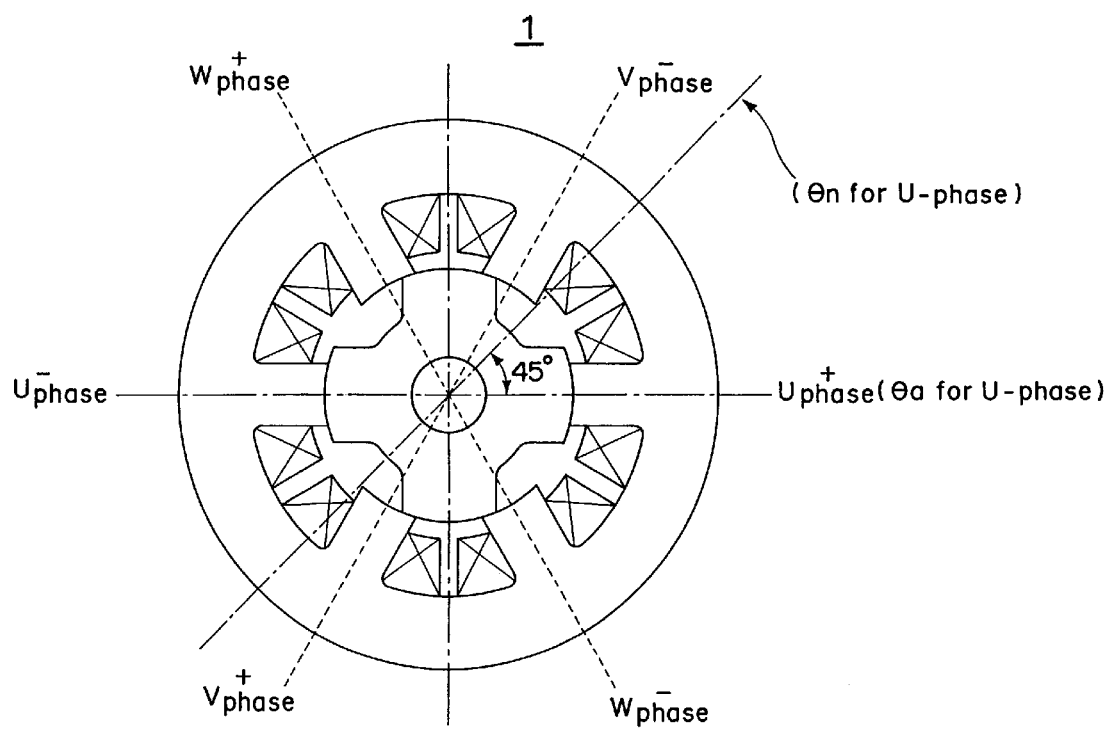
FIG. 1 shows the cross-sectional view of a switched reluctance motor.
Figure 2:
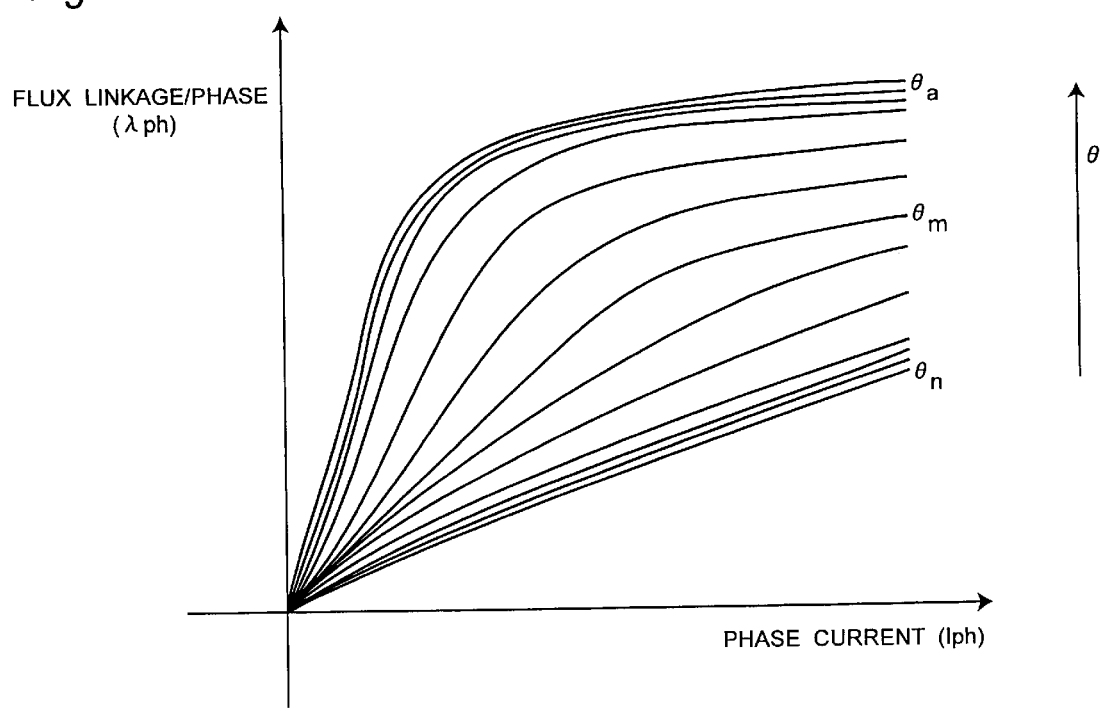
FIG. 2 shows the per phase flux-linkage/current characteristics with respect to rotor position of a switched reluctance motor.

$\theta_a$ is defined as the aligned position i.e. when a rotor pole aligns with a stator pole. $\theta_n$ is defined as the non-aligned position i.e. when a rotor pole is in between two stator poles as shown in FIG. 1. The value of n in the polynomial equation (3) is dependent on the magnetic design of a particular motor. The reason why the near middle position $\theta_r$ is selected as a reference position is that the flux linkage varies with the position $\theta$ in a high changing rate in vicinity of the middle position $\theta_m$ and thus the position $\theta$ with respect to the flux linkage can be easily determined.

Figure 4:
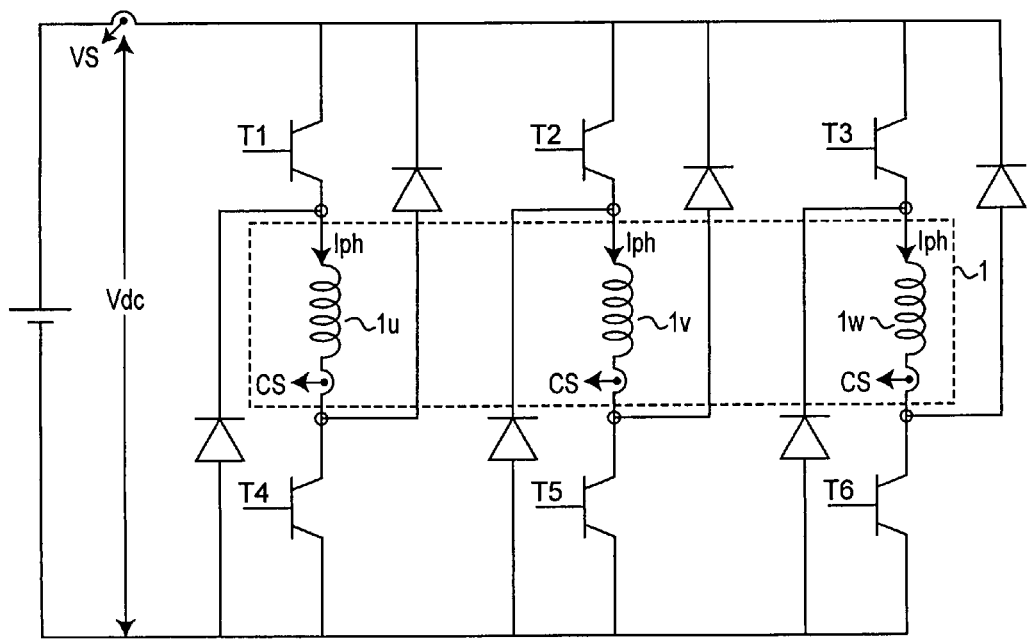
FIG. 4 shows a typical inverter circuit for the switched reluctance motor.

Use of fast processors will enable to calculate polynomial expressions easily. The reference flux-linkage value $\lambda_r$ with respect to phase current $I_{ph}$ is pre-determined off-line by locking the rotor at position $\theta_r$ and carrying out standard experiments. During motor rotation, the flux-linkage per phase $\lambda_{ph}$ is calculated on-line at every PWM interrupt or at every half-cycle PWM interrupt of the processor by sensing the d.c.-link voltage $V_{dc}$ and the phase current $I_{ph}$ of the inverter circuit as shown in FIG. 4. It is given by, $$\lambda_{ph} = (V_{dc} - I_{ph} * R - V_p) * dt \quad (7)$$

where R is the phase resistance of the SRM in the high frequency mode and $V_p$ is the voltage drop across the power devices. An average value of mutual flux (maximum 10% of the maximum per phase flux) should be considered for more accurate calculation of the per phase flux-linkage $\lambda_{ph}$. The on-line calculated per phase flux-linkage $\lambda_{ph}$ is continuously compared with the reference flux-linkage $\lambda_r$ in the processor. At the instant when $\lambda_{ph}$ is equal to $\lambda_r$, the absolute discrete rotor position $\theta_{abs}$ in mechanical degrees is determined or estimated as given below $$\theta_{abs} = K * 360°/N + \theta_{cal} \quad (8)$$

where, $\theta_{cal} = \theta_r$ and $K = (N-1)$.

From the information of $\theta_{abs}$, closed loop control techniques are generated to rotate the motor.

(Discrete Rotor Position Estimation Technique II)

Figure 6:
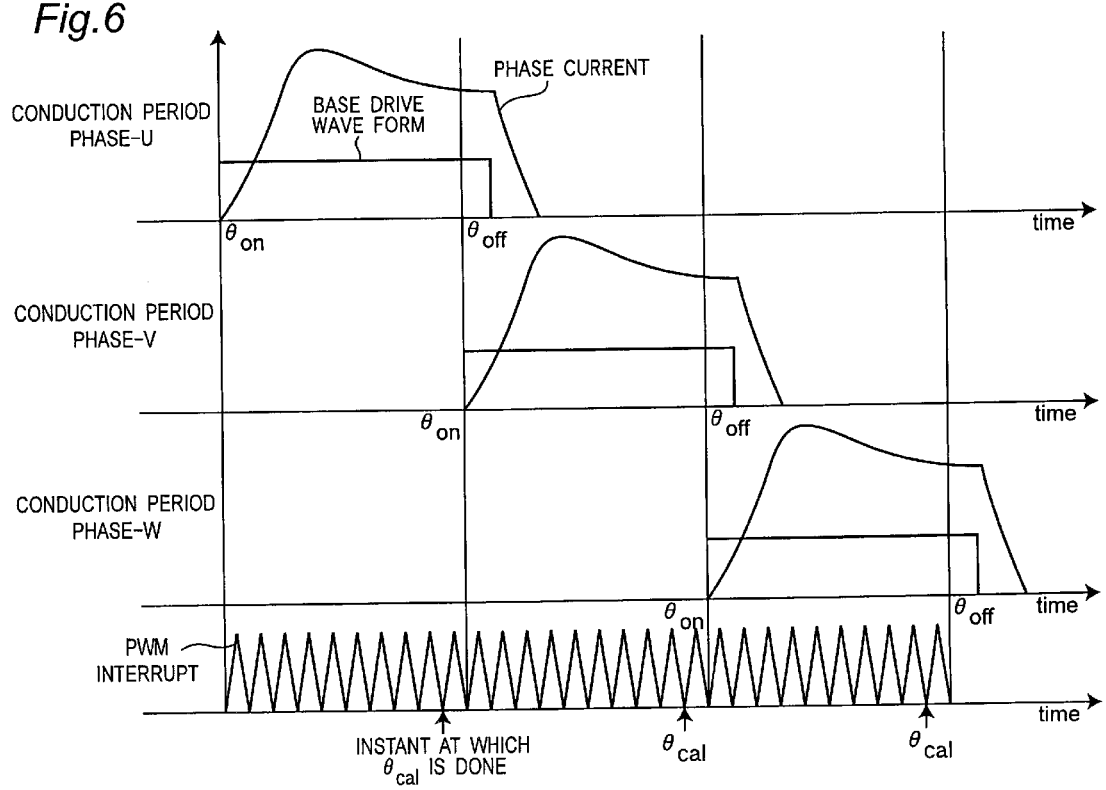
FIG. 6 shows the instant at which estimation of the exact rotor position $\theta_{cal}$ is carried out for the rotor position estimation technique II.

In the discrete rotor position estimation technique II, similarly the d.c.-link voltage $V_{dc}$ and the phase current $I_{ph}$ are sensed and the flux-linkage per phase $\lambda_{ph}$ is calculated on-line from equation (7) at every PWM interrupt of the processor. From the knowledge of $\lambda_{ph}$, the exact rotor position $\theta_{cal}$ is calculated only once either from the flux-linkage model or the inductance model of the active phase when the calculated flux-linkage $\lambda_{ph}$ is greater than the reference flux-linkage $\lambda_r$. The ideal instant to estimate the rotor position may be at one PWM interrupt before the next phase is turned ON. This is shown in FIG. 6. This concept is ideal when the turn-on angle is advanced at the rated speed for high torque applications. The absolute discrete rotor position $\theta_{abs}$ in one mechanical cycle is always calculated from the information of the exact rotor position $\theta_{cal}$ and is expressed by equation (8). From the knowledge of $\theta_{abs}$ control techniques are again generated to rotate the motor in closed loop.

(Discrete Rotor Position Estimation Technique III)

Figure 7:
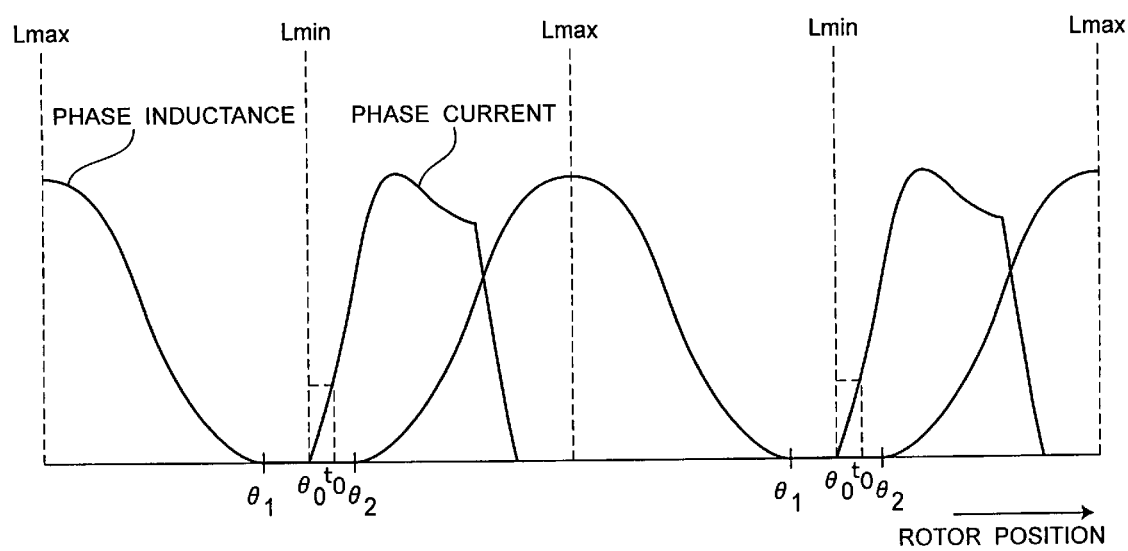
FIG. 7 shows the instant at which the measured actual phase current $I_{ph}$ and the estimated phase current Is are compared in the discrete rotor position estimation technique III.

The discrete rotor position estimation technique III is very simple and does not involve any exact rotor position estimation $\theta_{cal}$ as described in techniques I and II. This scheme includes identifying the minimum inductance region during the turn-on of a new phase so that the turn-on angle always lies in the minimum inductance region. This has been made possible by comparing the measured actual phase current $I_{ph}$ with an estimated phase current $I_s$ after a finite time interval to from the turn-on of a new phase as shown in FIG. 7. The estimated current $I_s$ is given by, $$I_s = (V_{dc} - I_{ph} R - V_p) * t_0 / L_{min} \quad (9).$$

Figure 3:
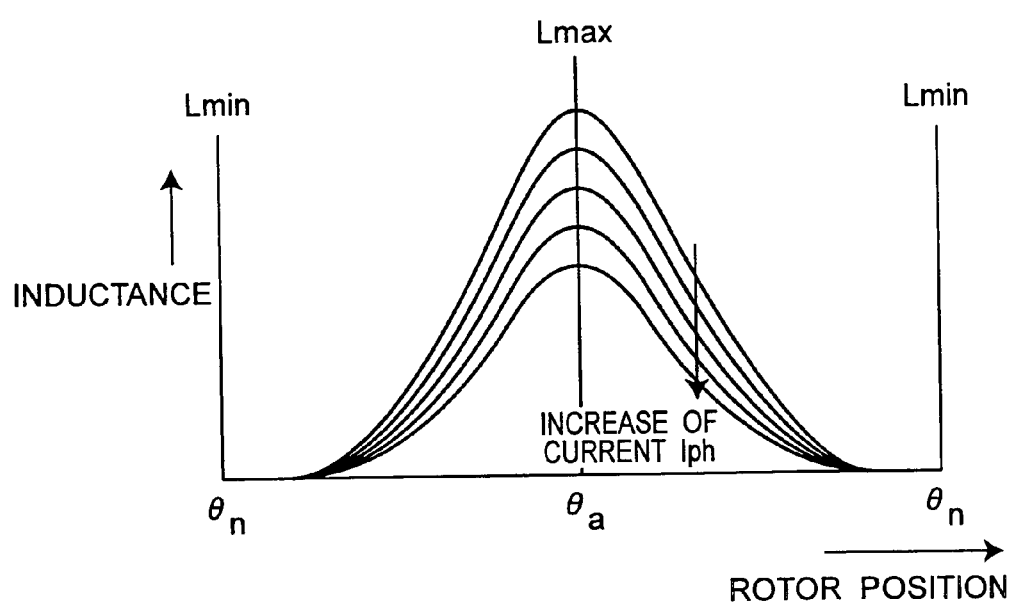
FIG. 3 shows the per phase inductance/current characteristics with respect to rotor position of a switched reluctance motor.

The value of minimum inductance $L_{min}$ is constant for a particular motor and does not vary with the phase current $I_{ph}$ as shown in FIG. 3. The minimum inductance region normally extends to few degrees and is typically dependent on the magnetic design of the motor. Hence, the approximate rotor position $\theta_{app}$ is known when the minimum inductance region is identified. Therefore, instead of exact rotor position $\theta_{cal}$, the knowledge of approximate rotor position $\theta_{app}$ is used to calculate the absolute discrete rotor position $\theta_{abs}$ and rotate the motor in closed loop.

In the discrete rotor position estimation techniques of I, II and III, a rotor position estimation error less than one mechanical degree is difficult to achieve. A small error in rotor position estimation at a particular speed can decrease the motoring torque i.e. the motor performance to a large extent. Hence, optimum control techniques are invented to minimize rotor position estimation error so that high performance is always achieved for the sensorless drive of SRM's. In addition, control techniques are invented to obtain the high torque even if there is a rotor position estimation error.

First Exemplary Embodiment

Figure 8:
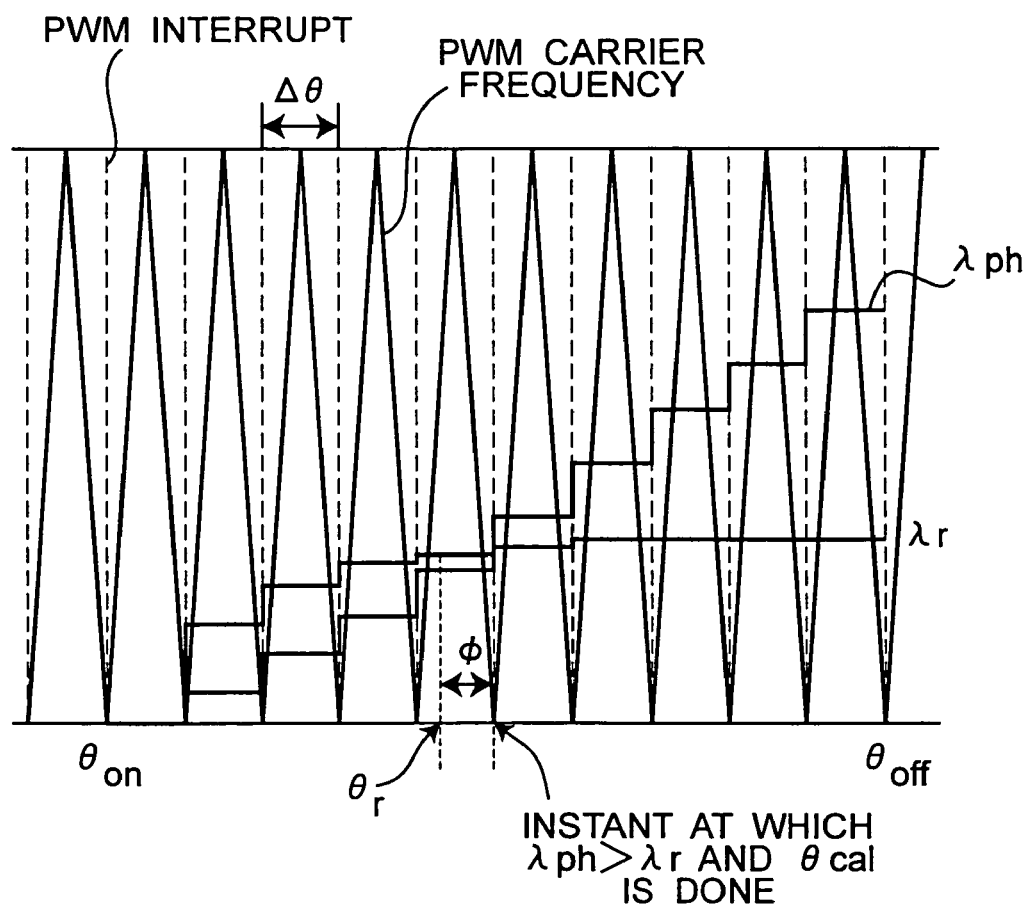
FIG. 8 shows the incremental change of per phase flux-linkage $\lambda_{ph}$ in every PWM interrupt of the processor in accordance with the first exemplary embodiment.

In the discrete rotor position estimation technique I, the per phase flux-linkage $\lambda_{ph}$ is calculated on-line in every PWM interrupt or every PWM half-cycle interrupt by sensing the d.c.-link voltage $V_{dc}$ and the phase current $I_{ph}$ and is defined by the equation (7) above. The incremental change of per phase flux-linkage $\lambda_{ph}$ at the valley of every PWM interrupt of the processor is shown in FIG. 8 where dt is the time interval between two PWM interrupts and $\theta_{on}$ is the turn-on angle and $\theta_{off}$ is the turn-off angle. Any digital technique cannot exactly define the instant when the per phase flux-linkage $\lambda_{ph}$ is equal to the reference flux-linkage $\lambda_r$. In this embodiment, the processor within a PWM interrupt identifies an instant when the per phase flux-linkage $\lambda_{ph}$ is greater than $\lambda_r$ as shown in FIG. 8. Therefore, for more accurate rotor position estimation, $\theta_{abs}$ of equation (8) in the discrete rotor position technique I has to be modified. In the simplest technique, the modification of $\theta_{abs}$ in equation (8) can be done by adding an angle $\phi$ such that, $$\theta_{abs}=K*360o/N+(\theta_r+\phi) \quad (10)$$

The combined angle $(\theta_r+\phi)$ now defines the exact rotor position $\theta_{cal}$. The angle $\phi$ can be obtained from a predetermined two dimensional look-up table in which $\Delta\lambda$ and phase current $I_{ph}$ are the variable parameters. $\Delta\lambda$ is defined as the difference between $I_{ph}$ and $\lambda_r$.

Alternatively, by the discrete rotor position estimation technique II, exact rotor position $\theta_{cal}$ should be calculated at the instant when the per phase flux-linkage $\lambda_{ph}$ is greater than the reference flux-linkage $\lambda_r$. Exact rotor position estimation can be carried out by analytical methods based on the flux-linkage model or the inductance model of the SRM. The absolute discrete rotor position $\theta_{abs}$ in one mechanical cycle is always calculated from the information of the exact rotor position $\theta_{cal}$ and is expressed by equation (8). The value of $\theta_{abs}$ which is defined in mechanical degrees in equation (8) can also be expressed in electrical degrees by considering the number of rotor poles (P).

Figure 9:
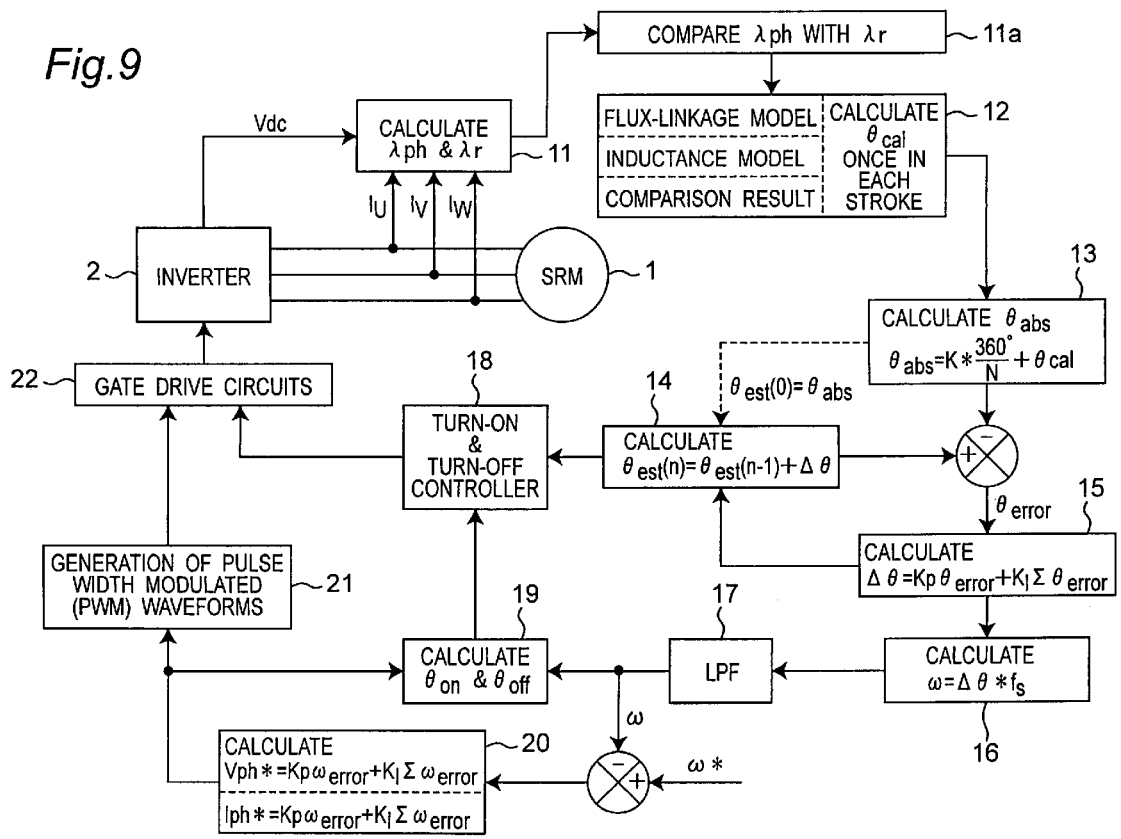
FIG. 9 shows the block diagram for closed loop control using control strategy I in accordance with the first exemplary embodiment.

FIG. 9A shows an entire block diagram of a driving apparatus of SRM for achieving the closed loop control with control strategy I according to the invention.

The SRM 1 is driven by the inverter (2) which includes switching devices T1 to T6 as shown in FIG. 4. The gate drive circuit (22) generates pulse width modulated base drive signals to turn-on and turn-off the switching devices T1 to T6 and generate a phase current. PWM control is done by the block (21) with PWM interrupt timer. Turn-on angle $\theta_{on}$ and turn-off angle $\theta_{off}$ are calculated by the block (19). The turn-on and turn-off controller (18) determines the turn-on and the turn-off timings of each phase based on the calculated turn-on and turn-off angles $\theta_{on}$ and $\theta_{off}$ and the estimated rotor position $\theta_{est}$.

In the control strategy I involving the discrete rotor position estimation technique I, phase current $I_{ph}$ and d.c.-link voltage $V_{dc}$ are sensed to calculate the per phase flux-linkage $\lambda_{ph}$ (by block 11). The flux-linkage $\lambda_{ph}$ is compared with the reference flux-linkage $\lambda_r$ (by block 11a). Referring to the comparison result, when the phase flux-linkage $\lambda_{ph}$ is greater than the reference flux-linkage $\lambda_r$, the rotor position $\theta_{cal}$ is once calculated (by block 12). The absolute discrete rotor position $\theta_{abs}$ is calculated (by block 13) and continuous rotor position $\theta_{est}$ is estimated from the absolute discrete rotor position $\theta_{abs}$ in the following way (by block 14). At the instant when the exact rotor position $\theta_{cal}$ is calculated (by block 12), the error between the absolute rotor position $\theta_{abs}$ and the estimated rotor position $\theta_{est}$ is calculated and processed in a proportional-integral (PI) control method (by block 15) to give the incremental rotor angle $\Delta\theta$ in every PWM interrupt. $\Delta\theta$ is expressed as $$\Delta\theta=Kp*\theta_{err}+\Sigma KI*\theta_{err} \quad (11)$$

where, $\theta_{err}=(\theta_{abs}-\theta_{est})$. At the start of rotor position estimation, $\theta_{est}$ is initialized as $\theta_{abs}$ and then calculated as follows $$\theta_{est}(n)=\theta_{est}(n-1)+\Delta\theta \quad (12).$$

Instead of a proportional-integral control method, a proportional control method can also be used.

The turn-on angle $\theta_{on}$ and turn-off angle $\theta_{off}$ of each phase is controlled by $\theta_{est}$ which can be expressed either in mechanical or electrical degrees (by block 18). For achieving the turn-on and the turn-off of each phase at any point in between two PWM interrupts, a very fast timer interrupt compared to the PWM interrupt has been defined.

The speed ($\omega$) of the motor is calculated (by block 16) from the incremental rotor angle $\Delta\theta$ in a relatively slow timer interrupt compared to the PWM interrupt. It is given by, $$\omega=\Delta\theta*fs \quad (13)$$

where, fs is the PWM carrier frequency. The speed ripple is filtered by processing it through a low-pass filter (LPF) (17). If the per phase flux-linkage $\lambda_{ph}$ is calculated in every half-cycle PWM interrupt, the incremental rotor displacement $\Delta\theta$ has to be defined for every half-cycle PWM interrupt and the speed ($\omega$) of the motor is expressed as, $$\omega=2*\Delta\theta*fs \quad (14).$$

The turn-on and the turn-off angle together with the phase voltage reference ($V_{ph}*$) or phase current reference ($I_{ph}*$) are continuously calculated within the processor and are varied depending on the speed ($\omega$) and the torque demand of the motor (by blocks 18-20). In closed loop control, the difference between the commanded speed ($\omega*$) and the calculated speed ($\omega$) is processed through a proportional-integral (PI) control block (20) to generate either the phase voltage reference ($V_{ph}*$) or the phase current reference ($I_{ph}*$). Either the phase voltage reference ($V_{ph}*$) is compared with the PWM carrier waveform or the phase current reference ($I_{ph}*$) is compared with the original phase current $I_{ph}$ to finally generate the pulse-width modulated (PWM) base drive waveforms (by block 21).

A gate drive circuit (22) controls an inverter (2) using the pulse-width modulated (PWM) waveforms and turn-on and turn-off angles from the turn-on and turn-off controller (18) to drive the SRM (1).

Second Exemplary Embodiment

Figure 11:
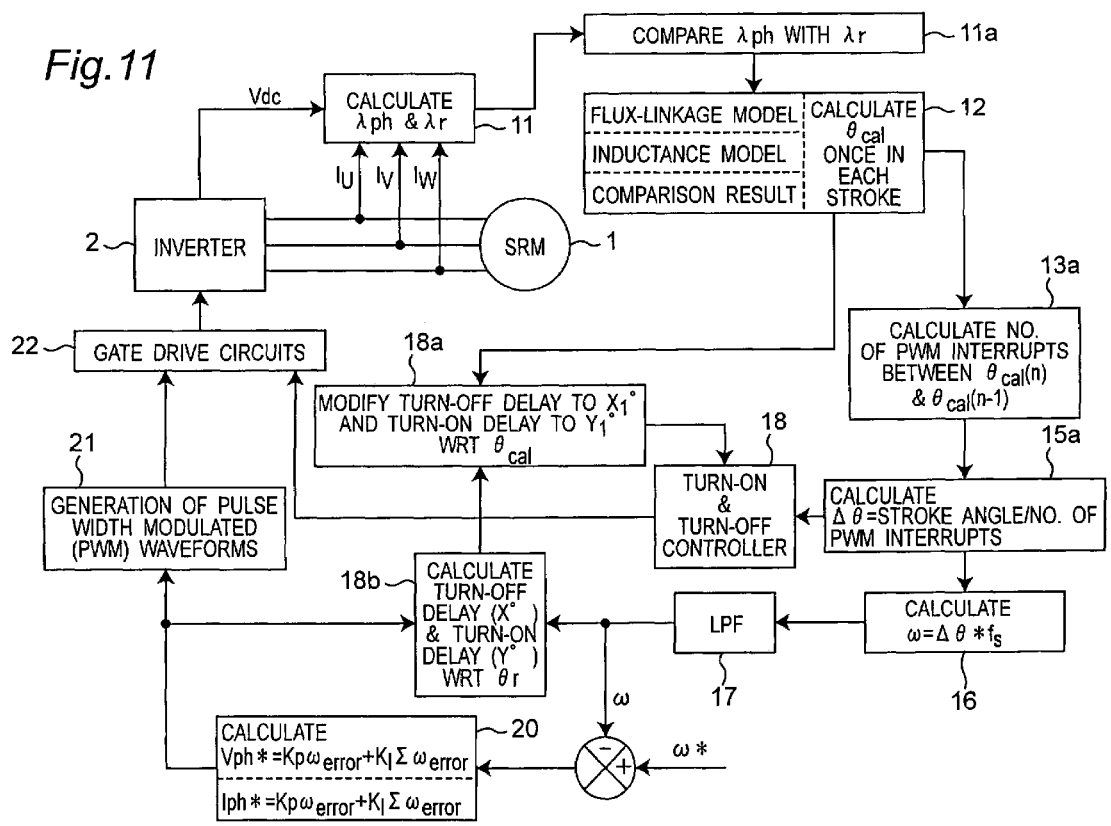
FIG. 11 shows the block diagram for closed loop control using control strategy II in accordance with the second exemplary embodiment.

FIG. 11 shows an entire block diagram of a driving apparatus of SRM for achieving the closed loop control with a control strategy II according to the invention.

In the control strategy II involving the discrete rotor position estimation technique I, instead of calculating $\theta_{est}$ continuously to control the turn-on and turn-off angle the incremental rotor displacement $\Delta\theta$ in every PWM interrupt can be calculated in an alternative way which can generate appropriate delays to turn-off the active phase and turn-on the next phase. The speed ($\omega$) of the motor is also calculated from the incremental rotor angle $\Delta\theta$ (by block 16), and the closed loop control can be executed in the similar manner described in the first exemplary embodiment. In the control strategy II, $\Delta\theta$ can be calculated by counting the number of PWM interrupts between two consecutive instants when the per phase flux-linkage $\lambda_{ph}$ is greater than the reference flux-linkage $\lambda_r$ (by blocks 13a and 15a), that is, between the instants of $\theta_{cal}(n)$ and $\theta_{cal}(n-1)$. It is given by, $$\Delta\theta = \text{stroke angle}(S)/\text{number of PWM interrupts} \quad (15).$$

Figure 10:
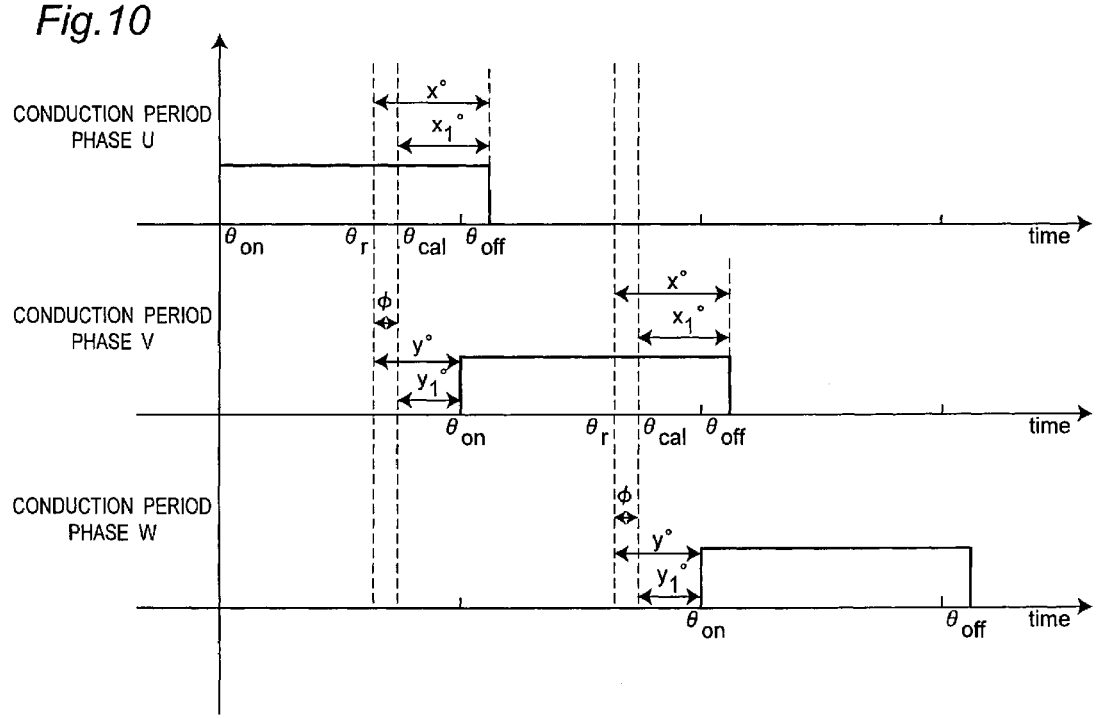
FIG. 10 shows the turn-on and the turn-off delay with respect to the reference rotor position $\theta_r$ in accordance with the second exemplary embodiment.

In equation (15), $\Delta\theta$ is expressed in mechanical degrees but also can be expressed in electrical degrees by considering the number of rotor poles. The exact rotor position $\theta_{cal}$ at the instant when the per phase flux-linkage $\lambda_{ph}$ is greater than the reference flux-linkage $\lambda_r$ is calculated in a similar way as described in the first exemplary embodiment. Calculation of $\theta_{cal}$ helps to adjust the turn-on and the turn-off delay and this is explained as follows. The turn-off delay (x°) of the active phase and the turn-on delay (y°) of the next phase are always defined with respect to the reference rotor position $\theta_r$ as shown in FIG. 10 for a specific speed ($\omega$) of the motor (by block 18b). The difference $\phi$ between the exact rotor position $\theta_{cal}$ and the reference rotor position $\theta_r$ is always estimated so that the turn-off delay (x°) of the active phase and the turn-on delay (y°) of the next phase are modified as $X_1°$ and $Y_1°$, respectively (by block 18a). The modified turn-off delay ($X_1°$) and the turn-on delay ($Y_1°$) are now redefined with respect to the exact rotor position $\theta_{cal}$, and can be expressed as, $$X_1° = x° - \phi \quad (16) \text{ and}$$

$$Y_1° = y° - \phi \quad (17).$$

For achieving the turn-on and the turn-off of each phase at any point in between two PWM interrupts, a very fast timer interrupt compared to the PWM interrupt has been defined as explained in the first exemplary embodiment. In addition, if the per phase flux-linkage $\lambda_{ph}$ is calculated in every half-cycle PWM interrupt, the incremental rotor displacement $\Delta\theta$ has to be defined for every half-cycle PWM interrupt.

The above control technique will help to achieve both high performance as well as maximum torque of the motor at the rated speed.

Third Exemplary Embodiment

Figure 12A:
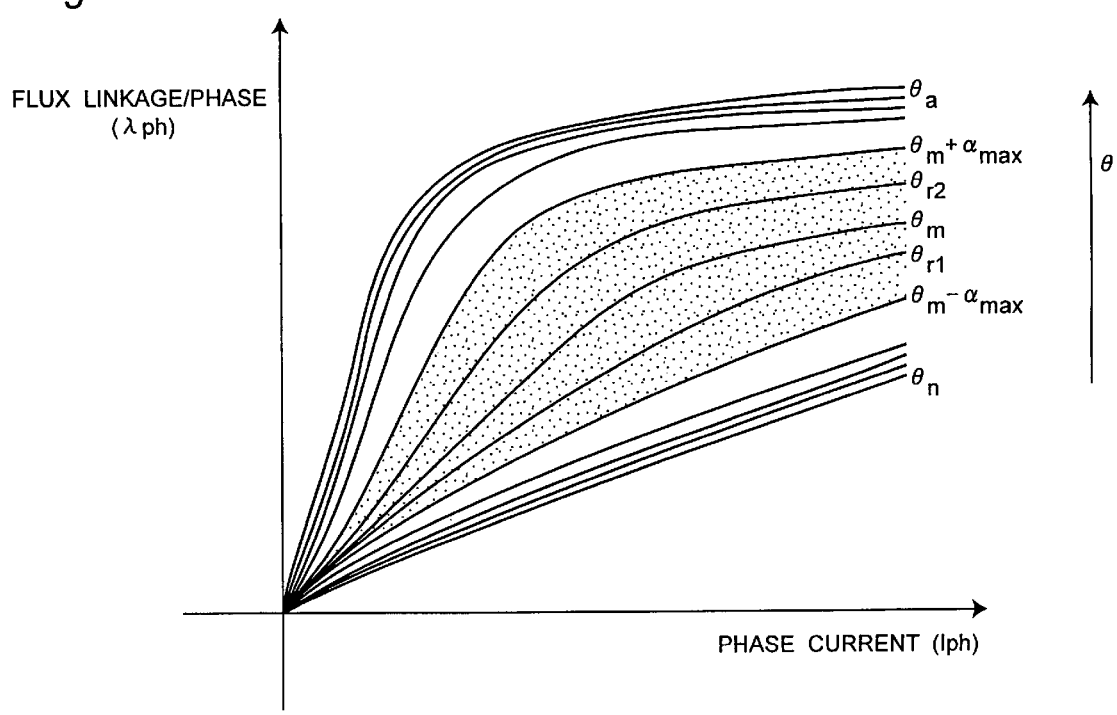
FIG. 12A shows two reference flux linkages corresponding to two reference rotor positions in accordance with the third exemplary embodiment.
Figure 12B:
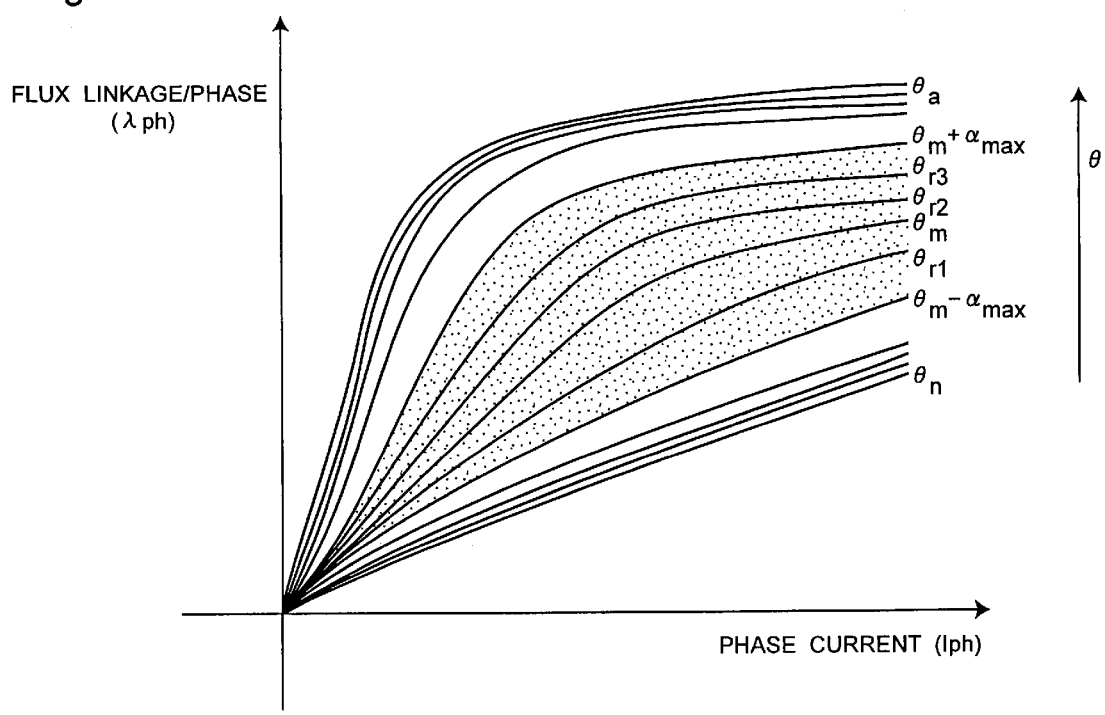
FIG. 12B shows three reference flux linkages corresponding to three reference rotor positions in accordance with the third exemplary embodiment.

The discrete rotor position estimation technique I described in the first and the second exemplary embodiment includes comparing the per phase flux-linkage $\lambda_{ph}$ with only one reference flux-linkage $\lambda_r$ defined for a rotor position $\theta_r$. Hence, in both cases, exact rotor position $\theta_{cal}$ and incremental rotor angle $\Delta\theta$ are calculated only once at the instant when the per phase flux-linkage $\lambda_{ph}$ is greater than the reference flux-linkage $\lambda_r$ during the conduction of each active phase. The discrete rotor position estimation technique I can be extended by defining two reference flux-linkages $\lambda_{r1}$ and $\lambda_{r2}$ at rotor positions $\theta_{r1}$ and $\theta_{r2}$ respectively as shown in FIG. 12A or three reference flux-linkages $\lambda_{r1}, \lambda_{r2}$ and $\lambda_{r3}$ at rotor positions $\theta_{r1}, \theta_{r2}$ and $\theta_{r3}$ respectively as shown in FIG. 12B by polynomial expression in phase current $I_{ph}$. All these rotor positions lie near the mid-position $\theta_m$ with a deviation angle $\alpha_{max}$ of 30°. Hence, the on-line estimated per phase flux-linkage $\lambda$ph is compared with two or three reference flux-linkages and accordingly two exact rotor positions ($\theta_{cal1}$ and $\theta_{cal2}$) or three exact rotor positions ($\theta_{cal1}, \theta_{cal2}$ and $\theta_{cal3}$) are calculated during the active conduction of each phase based on the comparison result.

Alternatively, the discrete rotor position estimation technique II can be extended by calculating the exact rotor positions either twice ($\theta_{cal1}$ and $\theta_{cal2}$) or thrice ($\theta_{cal1}, \theta_{cal2}$ and $\theta_{cal3}$) from the calculated flux-linkage $\lambda_{ph}$ by using either one of the inductance model or the flux linkage model of the active phase, at every consecutive PWM interrupt when the calculated flux-linkage $\lambda_{ph}$ is greater than the reference flux-linkage $\lambda_r$ corresponding to reference rotor angle $\theta_r$.

Figure 13:
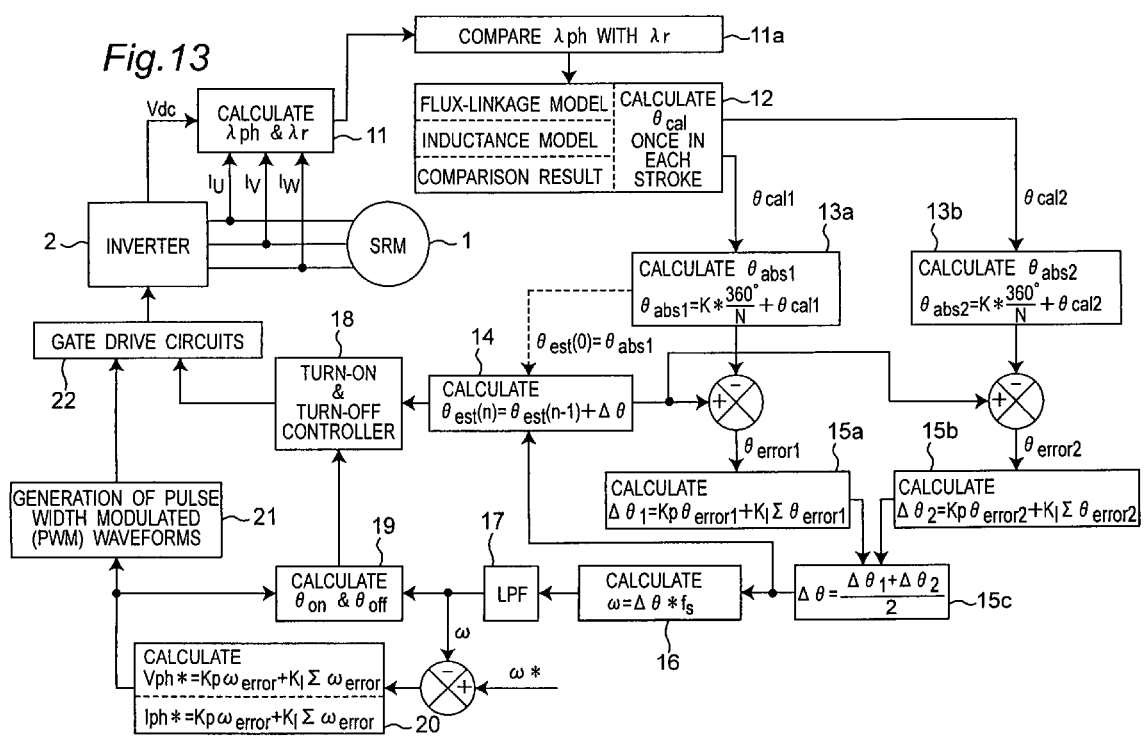
FIG. 13 shows the block diagram for closed loop control using control strategy I in accordance with the third exemplary embodiment.

Now from $\theta_{cal1}, \ldots$ by following either the control strategy I or the control strategy II, incremental rotor angle for every PWM interrupt is also calculated twice ($\Delta\theta_1$ and $\Delta\theta_2$) or thrice ($\Delta\theta_1, \Delta\theta_2$ and $\Delta\theta_3$) during the active conduction of each phase. The final incremental rotor angle $\Delta\theta$ for every PWM interrupt is the average of all the calculated incremental rotor angle. The final incremental rotor angle $\Delta\theta$ is used for the estimation of rotor position $\theta_{est}$ in control strategy I or providing the necessary delay for the turn-on or the turn-off a phase as described in control strategy II. The speed ($\omega$) of the motor is also calculated from the final incremental rotor angle $\Delta\theta$. A control block diagram using the control strategy I and calculating the incremental rotor angle for every PWM interrupt twice is shown in FIG. 13. In this figure, absolute discrete rotor positions $\theta_{abs1}$ and $\theta_{abs2}$ are calculated, respectively (by blocks 13a and 13b). Then the incremental rotor angles ($\Delta\theta_1$ and $\Delta\theta_2$) are calculated respectively and averaged to obtain $\Delta\theta$ (by blocks 15a to 15c). A control block diagram for calculating the incremental rotor angle thrice can be similarly obtained.

Fourth Exemplary Embodiment

In the discrete rotor position estimation technique II, the d.c.-link voltage $V_{dc}$ and the phase current $I_{ph}$ are sensed and the flux-linkage per phase $\lambda$ph is calculated on-line from equation (7) at every PWM interrupt of the processor. From the knowledge of $\lambda_{ph}$, the exact rotor position $\theta_{cal}$ is calculated either from the flux-linkage model or the inductance model of the active phase at one PWM interrupt before the next phase is turned ON. This is shown in FIG. 6. This concept is ideal when the turn-on angle is advanced at the rated speed for high torque applications. The absolute discrete rotor position $\theta_{abs}$ in one mechanical cycle is always calculated from the information of the exact rotor position $\theta_{cal}$ and is expressed by equation (7).

From the knowledge of $\theta$ abs, control strategies I and II are again applied in the discrete rotor position estimation technique II to rotate the motor in closed loop.

Fifth Exemplary Embodiment

There exist many industrial applications which require motor operation only at the rated speed and the maximum torque condition instead of the continuous variable speed-torque operation. For such applications, the discrete rotor position estimation technique III is proposed.

Figure 14:
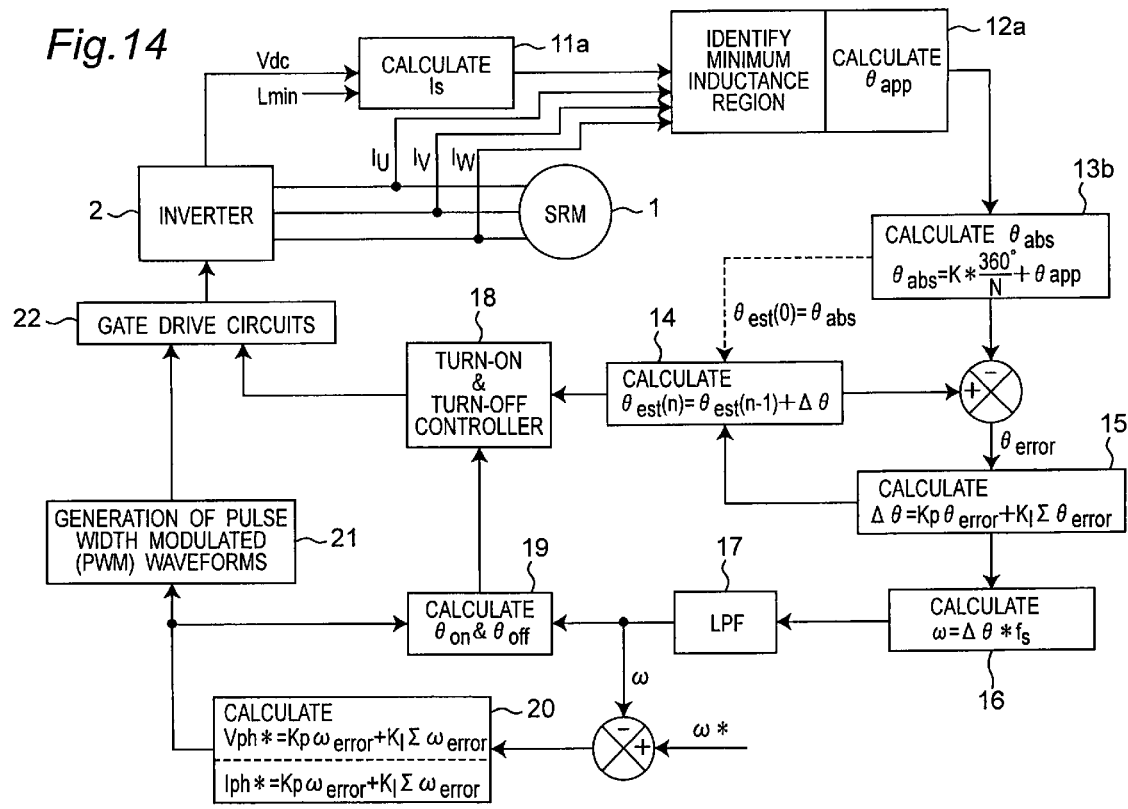
FIG. 14 shows the block diagram using the discrete rotor position estimation technique III and the control strategy I.

FIG. 14 shows an entire block diagram of driving apparatus of SRM using the discrete rotor position estimation technique III and the control strategy I. It should be noted that identical block diagram can be drawn for the discrete rotor position estimation technique III and the control strategy II.

The discrete rotor position technique III is very simple and does not involve any exact rotor position estimation $\theta_{cal}$ from the flux-linkage model or the inductance model as described in techniques I and II. The discrete rotor position technique III includes identifying the minimum inductance region during the turn-on of a new phase so that the turn-on angle always lies in the minimum inductance region. This has been made possible by comparing the measured actual phase current $I_{ph}$ with the estimated phase current $I_s$ after a finite time interval to from the turn-on of a new phase as shown in FIG. 7. The estimated current $I_s$ is calculated from equation (9) in the block (11a).

The locking of a particular phase and open loop starting technique with a forced drive always ensures that the turn-on angle is initially synchronized with the minimum inductance region. Coinciding the turn-on angle always with the minimum inductance region also guarantees perfect synchronous operation of the motor. Initially the turn-on angle can be anywhere between $\theta_1$ and $\theta_2$ as shown in FIG. 7. However, the turn-on angle is initialized with $\theta_0$ which is the middle position between $\theta_1$ and $\theta_2$. Therefore, the approximate rotor position $\theta_{app}$ at to can be easily calculated. In this embodiment, instead of exact rotor position $\theta_{cal}$, approximate rotor position $\theta_{app}$ is obtained (in block 12a), and the knowledge of approximate rotor position $\theta_{app}$ is used to calculate the absolute discrete rotor position $\theta_{abs}$ (in block 13b) and rotate the motor in closed loop by applying either control strategy I or II.

Sixth Exemplary Embodiment

Figure 15:
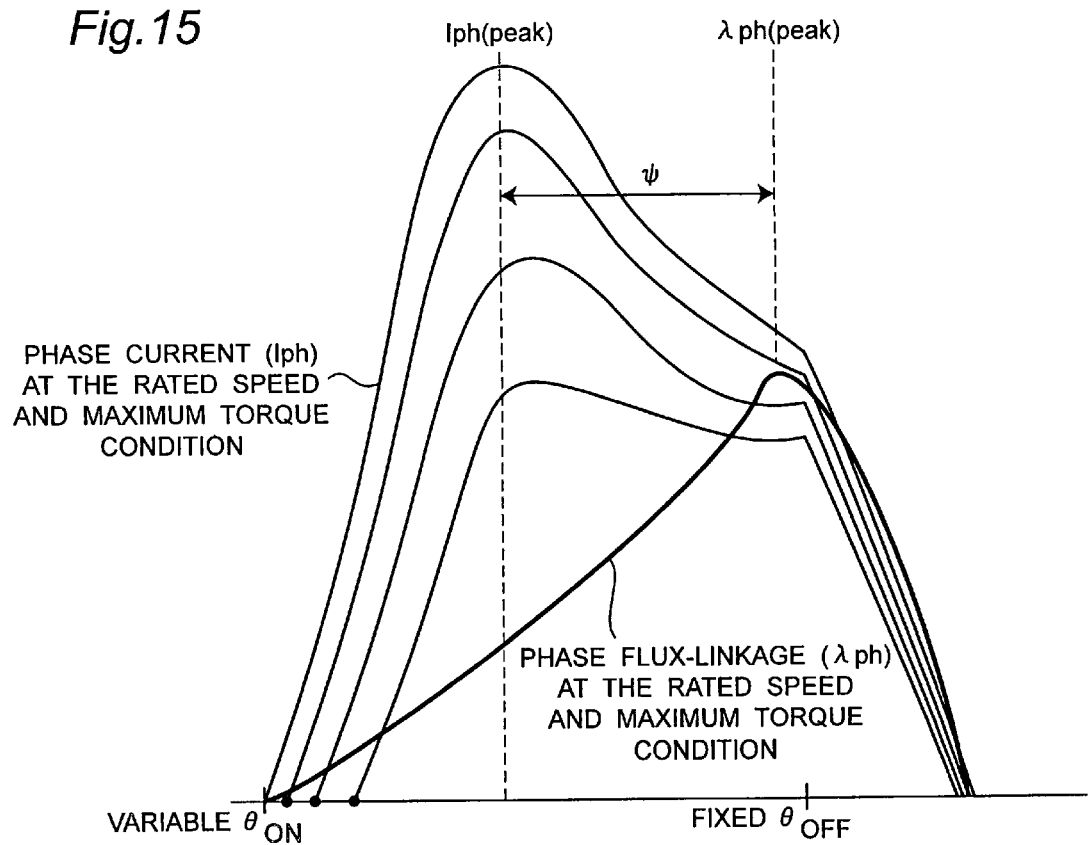
FIG. 15 shows typical per phase current waveforms and per phase flux waveform at the rated speed and the maximum torque condition in accordance with the fifth exemplary embodiment.
Figure 16:
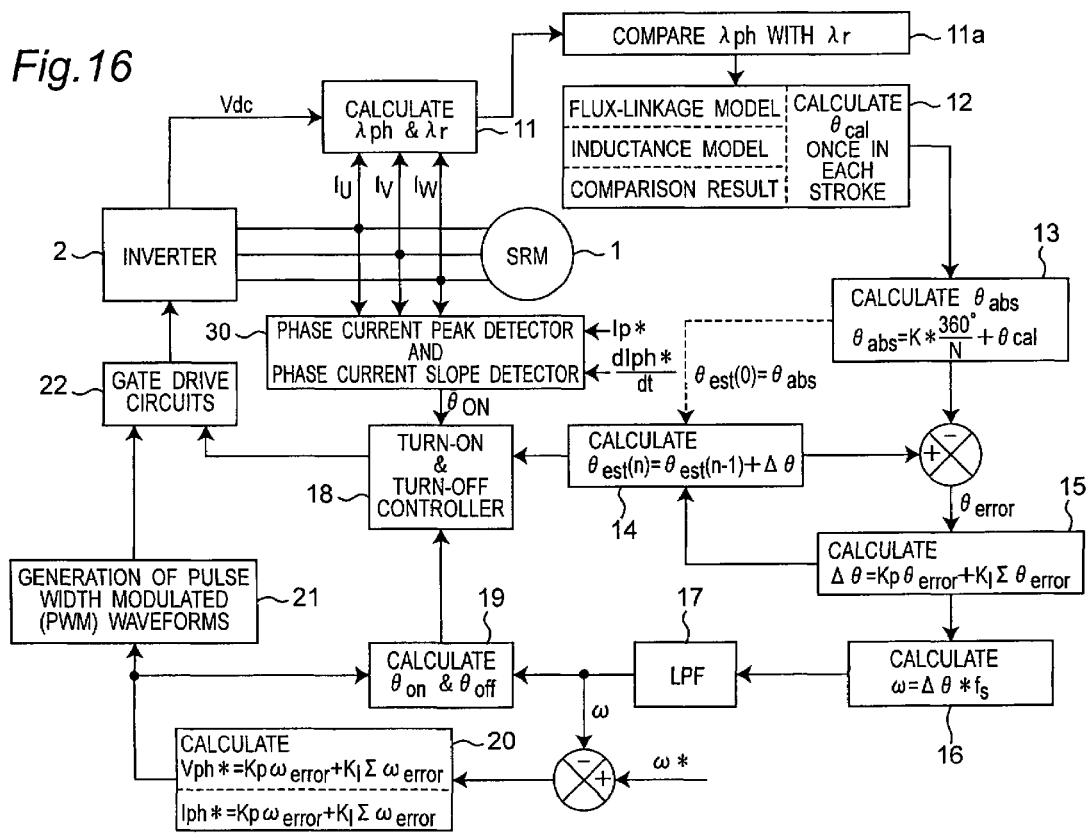
FIG. 16 shows the peak current detector block introduced in the closed loop block diagram using discrete rotor position technique I and control strategy I.

In the discrete rotor position estimation techniques of I, II and III, a rotor position estimation error less than one mechanical degree is difficult to achieve. At the rated speed and the maximum torque condition, the SRM operates in the single pulse mode. Typical per phase current waveforms with a variable turn-on angle and a fixed turn-off angle at the rated speed are shown in FIG. 15. The per phase flux waveform corresponding to the rated speed and the maximum torque condition is also shown in FIG. 15. From FIG. 15 it can be easily understood that the peak phase current ($I_{ph}$(peak)) which is immediately followed by the negative rate of change of phase current has to be continuously monitored if a specific application requires maximum torque operation at the rated speed. Therefore, keeping the turn-off angle fixed, the turn-on angle is advanced until the predetermined reference peak phase current ($I_p^*$) and a reference negative rate of change of phase current ($dI_{ph}^*/dt$) corresponding to the maximum torque are achieved. Instead of monitoring the negative rate of change of phase current, the lead angle ($\phi$) between the peak current ($I_{ph}$(peak)) and the peak flux ($\lambda_{ph}$(peak)) can be also monitored to judge the maximum torque at the rated speed condition. As shown in FIG. 16, the peak current detector block (30) is introduced in the closed loop block diagram using discrete rotor position technique I and control strategy I.

INDUSTRIAL APPLICABILITY

The proposed discrete position sensorless estimation schemes for the switched reluctance motors are ideal for several automotive applications such as the compressor drive in car air-conditioners for a conventional gasoline vehicle, an electric vehicle and a hybrid electric vehicle.

Examples of applications using the proposed rotor position estimation schemes and control strategies for the switched reluctance motor are shown in FIGS. 17A through 17G.

Figure 17A:
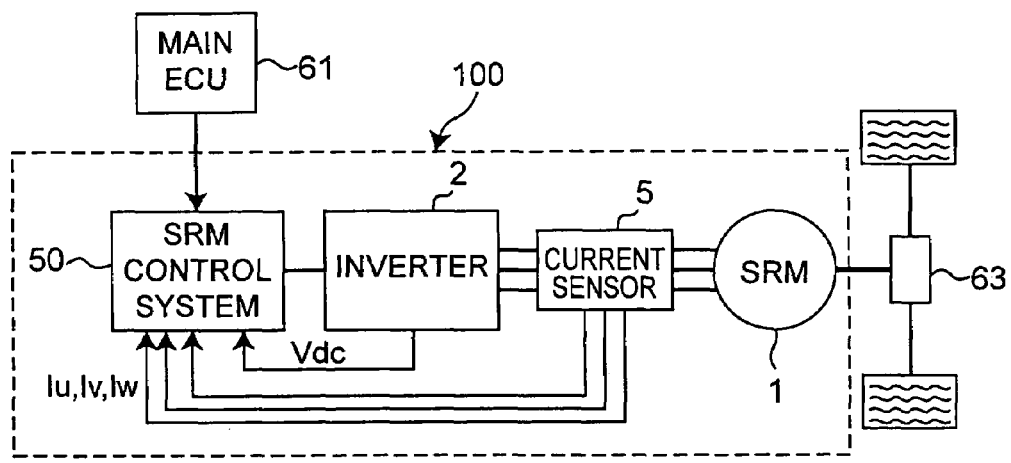
FIGS. 17A through 17G show examples of applications using the proposed rotor position estimation schemes and control strategies for the switched reluctance motor.

FIG. 17A is an explanatory diagram of an application of the invention to an electric vehicle. The drive unit (100) includes a switched reluctance motor (1), an inverter (2), a current sensor (5), and SRM control system (50). Typically it means that the SRM control system (50) has the same structure as that shown in FIG. 9, 11, 13, 14 or 16 except for the SRM (1). The drive unit (100) is coupled with a main ECU (Electrical Control Unit) (61) and a gear (63).

Figure 17B:
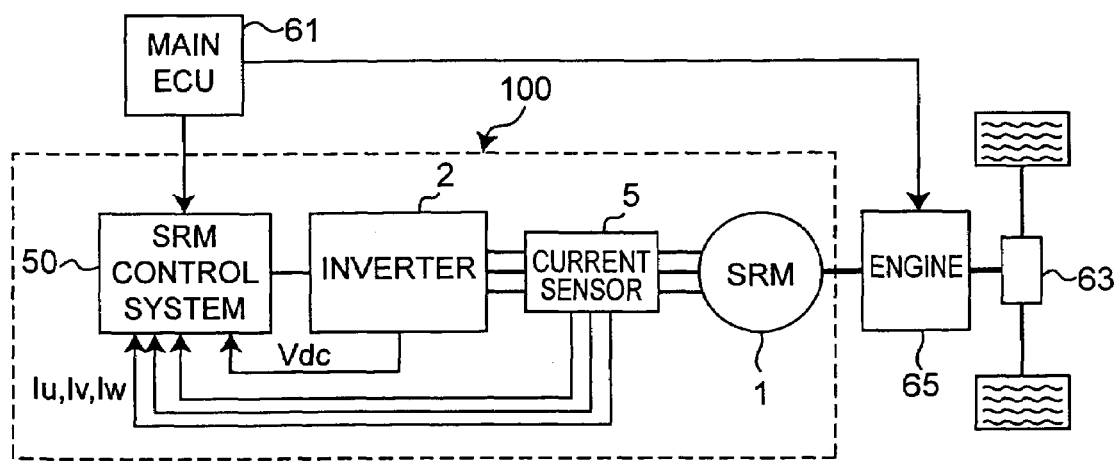
Figure 17C:
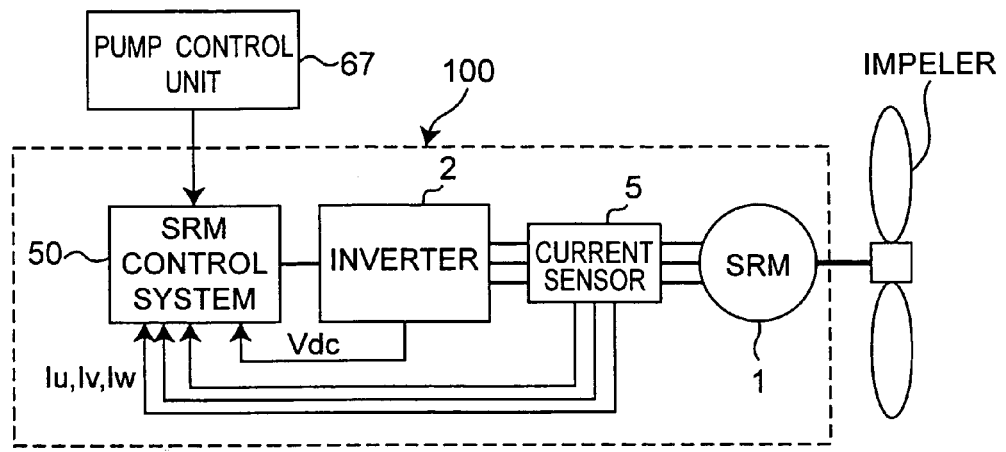

FIG. 17B also shows an application of the invention to a hybrid electric vehicle. The engine (65) is further provided to the structure of the FIG. 17B. FIG. 17C shows an application of the invention to a water pump.

Figure 17D:
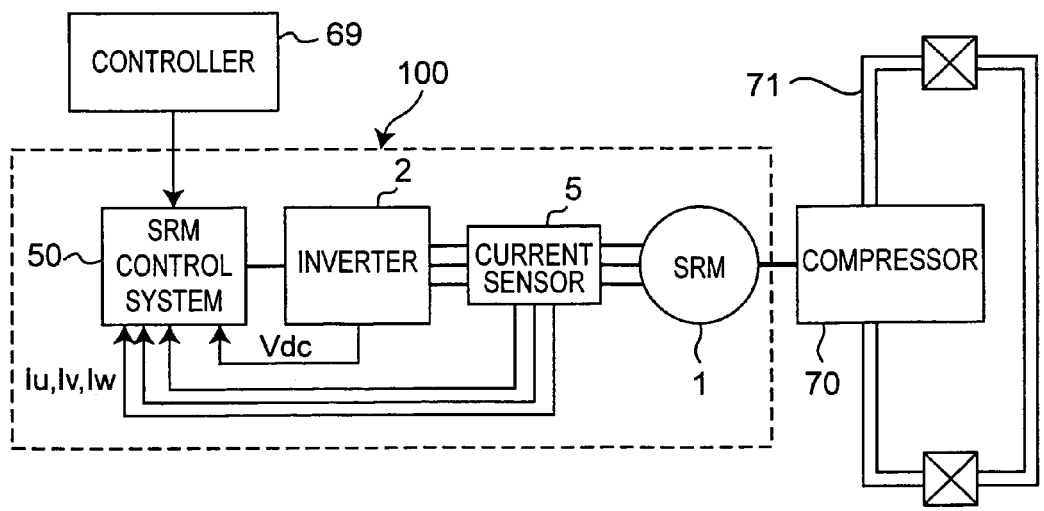

FIG. 17D shows an application of the invention to a compressor drive of an air conditioner or a refrigerator. The drive unit (100) drives a compressor (70) which compresses refrigerant circulating in a refrigeration cycle (71).

Figure 17E:
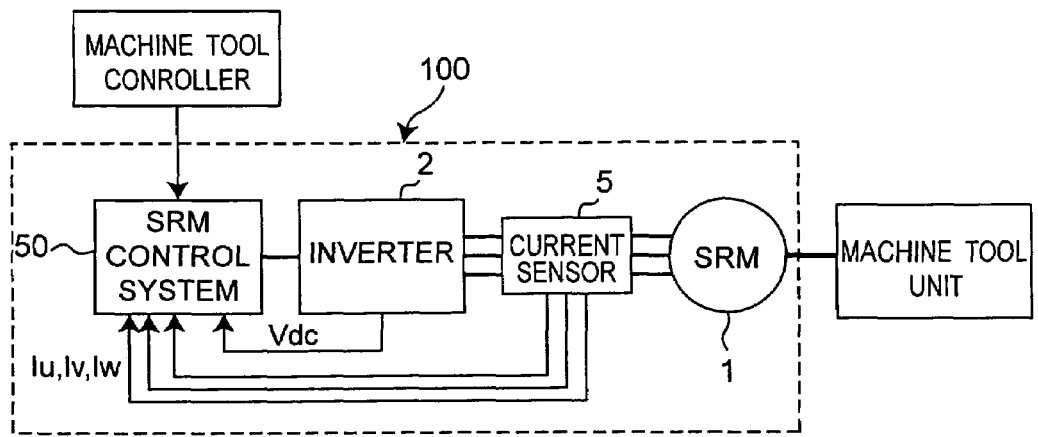
Figure 17F:
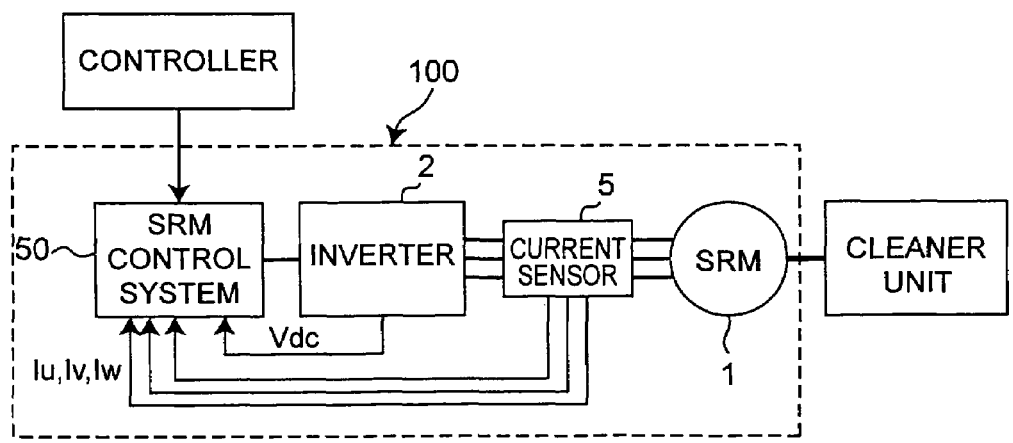
Figure 17G:
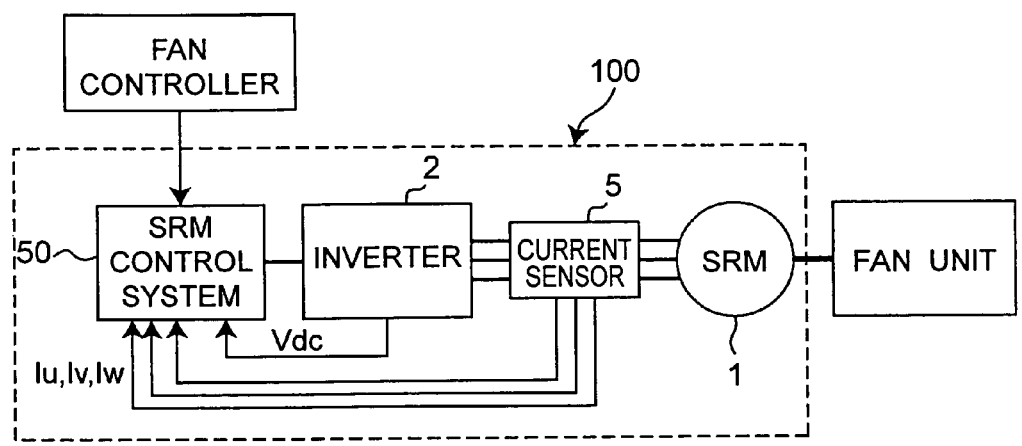

FIG. 17E shows an application of the invention to a machine tool. FIG. 17F shows an application of the invention to a cleaner. FIG. 17G shows an application of the invention to a fan device.

However, the proposed discrete position sensorless estimation techniques can be extended to any industrial applications involving these types of motors where the speed response required is low.

Although the present invention has been described in connection with specified embodiments thereof, many other modifications, corrections and applications are apparent to those skilled in the art. Therefore, the present invention is not limited by the disclosure provided herein but limited only to the scope of the appended claims.

The invention claimed is:

1. A control method of a switched reluctance motor comprising:
   (a) sensing a d.c.-link voltage $V_{dc}$ and a phase current $I_{ph}$;
   (b) calculating a flux-linkage $\lambda_{ph}$ of an active phase from the sensed d.c.-link voltage $V_{dc}$ and the sensed phase current $I_{ph}$;
   (c) comparing the calculated flux-linkage $\lambda_{ph}$ with a reference flux-linkage $\lambda_r$, the reference flux-linkage $\lambda_r$ related to a reference angle $\theta_r$ which lies between angles corresponding to aligned rotor position and non-aligned rotor position in the motor; and
   (d) controlling a turn-off angle $\theta_{off}$ of each active phase and a turn-on angle $\theta_{on}$ of the next active phase, based on a timing at which the calculated flux-linkage $\lambda_{ph}$ becomes greater than the reference flux-linkage $\lambda_r$.

2. A control method of a switched reluctance motor comprising:
   (a) calculating an estimated rotor position $\theta_{est}$ by adding up an incremental rotor angle $\Delta\theta$ every predetermined control period;
   (b) sensing a d.c.-link voltage $V_{dc}$ and a phase current $I_{ph}$;
   (c) calculating a flux-linkage $\lambda_{ph}$ of an active phase from the sensed d.c.-link voltage $V_{dc}$ and the sensed phase current $I_{ph}$;
   (d) comparing the calculated flux-linkage $\lambda_{ph}$ with a reference flux-linkage $\lambda_r$, the reference flux-linkage $\lambda_r$ related to a reference angle or which lies between angles corresponding to aligned rotor position and non-aligned rotor position in the motor;
   (e) when the calculated flux-linkage $\lambda_{ph}$ becomes greater than the reference flux-linkage $\lambda_r$ during the active conduction of a phase, performing once the following procedures including,
      1a determining estimated rotor position information $\theta_{cal}$ which is set at the reference angle $\theta_r$ related to the flux-linkage $\lambda_r$, or 1b determining estimated rotor position information $\theta_{cal}$ from the flux-linkage $\lambda_{ph}$ by using either one of a predetermined flux-linkage model or inductance model, or 1c determining estimated rotor position information $\theta_{cal}$ by adding a correction angle $\phi$ to the reference angle $\theta_r$ related to the flux-linkage $\lambda_r$; and 2 calculating an absolute rotor position $\theta_{abs}$ by adding the estimated rotor position information $\theta_{cal}$ to a stoke angle of the motor, and 3 determining and updating the incremental rotor angle $\Delta\theta$ by processing an error between the absolute rotor position $\theta_{abs}$ and the estimated rotor position $\theta_{est}$ through either one of a proportional-integral control and a proportional control; and (f) controlling a turn-off angle $\theta_{off}$ of each active phase and a turn-on angle $\theta_{on}$ of the next active phase based on the estimated rotor position $\theta_{est}$.

3. A control method of a switched reluctance motor comprising:

(a) sensing a d.c.-link voltage $V_{dc}$ and a phase current $I_{ph}$;

(b) calculating a flux-linkage $\lambda_{ph}$ of an active phase from the sensed d.c.-link voltage $V_{dc}$ and the sensed phase current $I_{ph}$;

(c) comparing the calculated flux-linkage $\lambda_{ph}$ with a reference flux-linkage $\lambda_r$, the reference flux-linkage $\lambda_r$ related to a reference angle $\theta_r$ which lies between angles corresponding to aligned rotor position and non-aligned rotor position in the motor;

(d) when the calculated flux-linkage $\lambda_{ph}$ becomes greater than the reference flux-linkage $\lambda_r$ during the active conduction of a phase, performing once the following procedures including, 1 determining estimated rotor position information $\theta_{cal}$ which is set at the reference angle $\theta_r$ related to the flux-linkage $\lambda_r$;

2 calculating and updating an incremental rotor angle $\Delta\theta$ by using an elapsed time from the instant at which the estimated rotor position information $\theta_{cal}$ in the previous cycle is determined; and (e) controlling a turn-off angle $\theta_{off}$ of each active phase and a turn-on angle $\theta_{on}$ of the next phase, based on the incremental rotor angle $\Delta\theta$, and the turn-off delay and turn-on delay relating to the reference angle $\theta_r$.

4. A control method of a switched reluctance motor comprising:

(a) sensing a d.c.-link voltage $V_{dc}$ and a phase current $I_{ph}$;

(b) calculating a flux-linkage $\lambda_{ph}$ of an active phase from the sensed d.c.-link voltage $V_{dc}$ and the sensed phase current $I_{ph}$;

(c) comparing the calculated flux-linkage $\lambda_{ph}$ with a reference flux-linkage $\lambda_r$, the reference flux-linkage $\lambda_r$ related to a reference angle $\theta_r$ which lies between angles corresponding to aligned rotor position and non-aligned rotor position in the motor;

(d) when the calculated flux-linkage $\lambda_{ph}$ becomes greater than the reference flux-linkage $\lambda_r$ during the active conduction of a phase, performing once the following procedures including, 1a determining estimated rotor position information $\theta_{cal}$ from the flux-linkage $\lambda_{ph}$ by using either one of a predetermined flux-linkage model and inductance model, or 1b determining estimated rotor position information $\theta_{cal}$ by adding a correction angle $\phi$ to the reference angle $\theta_r$ related to the flux-linkage $\lambda_r$; and 2 calculating and updating an incremental rotor angle $\Delta\theta$ by using an elapsed time from the instant at which the estimated rotor position information $\theta_{cal}$ in the previous cycle is determined; and 3 correcting a turn-on delay and a turn-off delay which are related to the reference angle or based on the estimated rotor position information $\theta_{cal}$; and (e) controlling a turn-off angle $\theta_{off}$ of each active phase and a turn-on angle $\theta_{on}$ of the next phase, based on the incremental rotor angle $\Delta\theta$, and the corrected turn-off and turn-on delays.

5. A control method of a switched reluctance motor comprising:

(a) calculating an estimated rotor position $\theta_{est}$ by adding up an incremental rotor angle $\Delta\theta$ every predetermined control period;

(b) sensing a d.c.-link voltage $V_{dc}$ and a phase current $I_{ph}$;

(c) calculating a flux-linkage $\lambda_{ph}$ of an active phase from the sensed d.c.-link voltage $V_{dc}$ and the sensed phase current $I_{ph}$;

(d) comparing the calculated flux-linkage $\lambda_{ph}$ with a plurality of reference flux-linkages $\lambda_{rn}$ (n=1, ..., k), each of the reference flux-linkages $\lambda_{rn}$ (n=1, ..., k) related to each of reference angles $\theta_{rn}$ (n=1, ..., k) which lie between angles corresponding to aligned rotor position and non-aligned rotor position in the motor;

(e) each time the calculated flux-linkage $\lambda_{ph}$ becomes greater than each of the reference flux-linkages $\lambda_{rn}$ during the active conduction of a phase, performing once the following procedures including, 1a determining estimated rotor position information $\theta_{caln}$ (n=1, ..., k) which is set at the reference angle $\theta_{rn}$ related to the flux-linkages $\lambda_{rn}$, or 1b determining estimated rotor position information $\theta_{caln}$ (n=1, ..., k) from the flux-linkage $\lambda_{ph}$ by using either one of a predetermined flux-linkage model or inductance model, or 1c determining estimated rotor position information $\theta_{caln}$ (n=1, ..., k) by adding a correction angle $\phi$ to the reference angle $\theta_{rn}$ related to the flux-linkages $\lambda_{rn}$; and 2 calculating an absolute rotor position $\theta_{abs}$ by adding the estimated rotor position information $\theta_{caln}$ to a stoke angle of the motor, and 3 determining and updating the incremental rotor angle $\Delta\theta$ by processing an error between the absolute rotor position $\theta_{abs}$ and the estimated rotor position $\theta_{est}$ through either one of a proportional-integral control and a proportional control; and (f) controlling a turn-off angle $\theta_{off}$ of each active phase and a turn-on angle $\theta_{on}$ of the next active phase based on the estimated rotor position $\theta_{est}$.

6. A control method of a switched reluctance motor comprising:

(a) sensing a d.c.-link voltage $V_{dc}$ and a phase current $I_{ph}$;

(b) calculating a flux-linkage $\lambda_{ph}$ of an active phase from the sensed d.c.-link voltage $V_{dc}$ and the sensed phase current $I_{ph}$;

(c) comparing the calculated flux-linkage $\lambda_{ph}$ with a plurality of reference flux-linkages $\lambda_r$ (n=1, ..., k), each of the reference flux-linkages $\lambda_r$ (n=1, ..., k) related to each of reference angles $\theta_r$ (n=1, ..., k) which lie between angles corresponding to aligned rotor position and non-aligned rotor position in the motor;

(d) each time the calculated flux-linkage $\lambda_{ph}$ becomes greater than each of the reference flux-linkages $\lambda_{rn}$ during the active conduction of a phase, performing once the following procedures including, 1 determining estimated rotor position information $\theta_{caln}$ (n=1, ..., k) which is set at the reference angle $\theta_{rn}$ related to the flux-linkages $\lambda_{rn}$;

2 calculating and updating an incremental rotor angle $\Delta\lambda_n$ (n=1, ..., k) by using an elapsed time from the instant at which the estimated rotor position information $\theta_{caln}$ in the previous cycle is determined;

3 when the calculated flux-linkage $\lambda_{ph}$ becomes greater than the maximum reference flux-linkage $\lambda_{rk}$, averaging the incremental rotor angles $\Delta\theta_n$ (n=1, ..., k) to determine and update an incremental rotor angle $\Delta\theta$; and (e) controlling a turn-off angle $\theta_{off}$ of each active phase and a turn-on angle $\theta_{on}$ of the next phase, based on the incremental rotor angle $\Delta\theta$, and turn-off delay and turn-on delay related to the reference angle $\theta_{rn}$ (n=1, ..., k).

7. A control method of a switched reluctance motor comprising:

(a) sensing a d.c.-link voltage $V_{dc}$ and a phase current $I_{ph}$;

(b) calculating a flux-linkage $\lambda_{ph}$ of an active phase from the sensed d.c.-link voltage $V_{dc}$ and the sensed phase current $I_{ph}$;

(c) comparing the calculated flux-linkage $\lambda_{ph}$ with a plurality of reference flux-linkages $\lambda_{rn}$ (n=1, ..., k), each of the reference flux-linkages $\lambda_{rn}$ related to each of reference angles $\theta_{rn}$ (n=1, ..., k) which lie between angles corresponding to aligned rotor position and non-aligned rotor position in the motor;

(d) each time the calculated flux-linkage $\lambda_{ph}$ becomes greater than each of the reference flux-linkages $\lambda_{rn}$ during the active conduction of a phase, performing once the following procedures including, 1 determining estimated rotor position information $\theta_{caln}$ (n=1, ..., k) from the flux-linkage $\lambda_{ph}$ by using either one of a predetermined flux-linkage model and inductance model, 2 calculating and updating an incremental rotor angle $\Delta\theta$ by using an elapsed time from the instant at which the estimated rotor position information $\theta_{caln}$ in the previous cycle is determined, 3 when the calculated flux-linkage $\lambda_{ph}$ becomes greater than the maximum reference flux-linkage $\lambda_{rk}$, averaging the incremental rotor angles $\Delta\theta_n$ (n=1, ..., k) to determine and update an incremental rotor angle $\Delta\theta$, and 4 correcting a turn-on delay and turn-off delay which are related to the reference flux-linkages $\lambda_{rn}$, based on the estimated rotor position information $\theta_{caln}$; and (e) controlling a turn-off angle $\theta_{off}$ of each active phase and a turn-on angle $\theta_{on}$ of the next phase, based on the incremental rotor angle $\Delta\theta$, and the corrected turn-off and turn-on delays.

8. A control method of a switched reluctance motor comprising:

(a) sensing a d.c.-link voltage $V_{dc}$ and a phase current $I_{ph}$;

(b) calculating a flux-linkage $\lambda_{ph}$ of an active phase from the sensed d.c.-link voltage $V_{dc}$ and the sensed phase current $I_{ph}$;

(c) comparing the calculated flux-linkage $\lambda_{ph}$ with a plurality of reference flux-linkages $\lambda_{rn}$ (n=1, ..., k), each of the reference flux-linkage $\lambda_{rn}$ (n=1, ..., k) related to each of reference angles $\theta_{rn}$ (n=1, ..., k) which lie between angles corresponding to aligned rotor position and non-aligned rotor position in the motor;

(d) each time the calculated flux-linkage $\lambda_{ph}$ becomes greater than each of the reference flux-linkages $\lambda_{rn}$ during the active conduction of a phase, performing once the following procedures including, 1 determining estimated rotor position information $\theta_{caln}$ (n=1, ..., k) by adding a correction angle $\phi$ to the reference angle mm related to the reference flux-linkages $\lambda_{rn}$, 2 calculating an incremental rotor angle $\Delta\theta_n$ (n=1, ..., k) by using an elapsed time from the instant at which the estimated rotor position information $\theta_{caln}$ in the previous cycle is determined, and 3 when the calculated flux-linkage $\lambda_{ph}$ becomes greater than the maximum reference flux-linkage $\lambda_{rk}$, averaging the incremental rotor angles $\Delta\theta_n$ (n=1, ..., k) to determine and update an incremental rotor angle $\Delta\theta$;

(e) controlling a turn-off angle $\theta_{off}$ of each active phase and a turn-on angle $\theta_{on}$ of the next phase, based on the incremental rotor angle $\Delta\theta$, and a turn-off delay and a turn-on delay which are determined according to the reference angle $\theta_{rn}$.

9. A control method of a switched reluctance motor comprising:

(a) calculating an estimated rotor position $\theta_{est}$ by adding up an incremental rotor angle $\Delta\theta$ every predetermined control period;

(b) sensing a d.c.-link voltage $V_{dc}$ and a phase current $I_{ph}$;

(c) calculating an estimated current $I_s$ from the sensed d.c.-link voltage $V_{dc}$, the sensed phase current $I_{ph}$, and a value completely or approximately equal to the minimum value of a motor inductance;

(d) comparing the sensed phase current $I_{ph}$ with the estimated current $I_s$; and (e) controlling a turn-off angle $\theta_{off}$ of each active phase and a turn-on angle $\theta_{on}$, of the next active phase, based on a timing when an error between the sensed phase current $I_{ph}$ and the estimated current $I_s$ becomes equal to or less than a predetermined value.

10. A control method of a switched reluctance motor comprising:

(a) calculating an estimated rotor position $\theta_{est}$ by adding up an incremental rotor angle $\Delta\theta$ every predetermined control period;

(b) sensing a d.c.-link voltage $V_{dc}$ and a phase current $I_{ph}$;

(c) calculating an estimated current $I_s$ from the sensed d.c.-link voltage $V_{dc}$, the sensed phase current $I_{ph}$, and a value completely or approximately equal to the minimum value of a motor inductance;

(d) comparing the sensed phase current $I_{ph}$ with the estimated current $I_s$;

(e) when an error between the sensed phase current $I_{ph}$ and the estimated current $I_s$ becomes equal to or less than a predetermined value, performing once the following procedures including, 1 determining a rotor position $\theta_{app}$ which is related to the estimated current $I_s$ in advance, 2 calculating an absolute rotor position $\theta_{abs}$ by adding the rotor position $\theta_{app}$ to a stoke angle of the motor, and 3 determining and updating the incremental rotor angle $\Delta\theta$ by processing an error between the absolute rotor position $\theta_{abs}$ and the estimated rotor position $\theta_{est}$ through either one of a proportional-integral control and a proportional control; and (f) controlling a turn-off angle $\theta_{off}$ of each active phase and a turn-on angle $\theta_{on}$ of the next active phase, based on the estimated rotor position $\theta_{est}$.

11. A control method of a switched reluctance motor comprising:

(a) sensing a d.c.-link voltage $V_{dc}$ and a phase current $I_{ph}$;

(b) calculating an estimated current $I_s$ from the sensed d.c.-link voltage $V_{dc}$, the sensed phase current $I_{ph}$, and a value completely or approximately equal to the minimum value of the motor inductance;

(c) comparing the sensed phase current $I_{ph}$ with the estimated current $I_s$;

(d) when an error between the sensed phase current $I_{ph}$ and the estimated current $I_s$ becomes equal to or less than a predetermined value, performing once the following procedures including, 1 determining a rotor position $\theta_{app}$ which is related to the estimated current $I_s$ in advance;

2 calculating and updating an incremental rotor angle $\Delta\theta$ by using an elapsed time from the instant at which the rotor position $\theta_{app}$ in the previous cycle is determined; and (e) controlling a turn-off angle $\theta_{off}$ of each active phase and a turn-on angle $\theta_{on}$ of the next active phase, based on the incremental rotor angle $\Delta\theta$, and a turn-off delay and a turn-on delay which are related to the rotor position $\theta_{app}$.

* * * * *

UNITED STATES PATENT AND TRADEMARK OFFICE
CERTIFICATE OF CORRECTION

PATENT NO. : 7,271,556 B2  
APPLICATION NO. : 10/536571  
DATED : September 18, 2007  
INVENTOR(S) : Kishibe et al.

Page 1 of 1

It is certified that error appears in the above-identified patent and that said Letters Patent is hereby corrected as shown below:

At Column 12, line 58, "angle or which" should read -- angle $\theta_r$ which -- as indicated in amendment filed on March 21, 2007.

At Column 15, line 9, "$\Delta\lambda_n$" should read -- $\Delta\theta_n$ -- as indicated in amendment filed on March 21, 2007.

At Column 16, line 10, "angle mm" should read -- $\theta_m$ -- as indicated in amendment filed on March 21, 2007.

Signed and Sealed this

First Day of April, 2008

JON W. DUDAS  
*Director of the United States Patent and Trademark Office*